(12) United States Patent
Fujii

(10) Patent No.: US 7,859,991 B2
(45) Date of Patent: Dec. 28, 2010

(54) SIGNAL TRANSMITTING APPARATUS, POWER SUPPLYING SYSTEM, AND SERIAL COMMUNICATION APPARATUS

(75) Inventor: Tatsuya Fujii, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 1476 days.

(21) Appl. No.: 10/552,688

(22) PCT Filed: Apr. 15, 2004

(86) PCT No.: PCT/JP2004/005376

§ 371 (c)(1), (2), (4) Date: Oct. 11, 2005

(87) PCT Pub. No.: WO2004/093377

PCT Pub. Date: Oct. 28, 2004

(65) Prior Publication Data

US 2006/0280112 A1 Dec. 14, 2006

(30) Foreign Application Priority Data

Apr. 17, 2003 (JP) .............................. 2003-112916
Apr. 17, 2003 (JP) .............................. 2003-112922
Apr. 17, 2003 (JP) .............................. 2003-112930

(51) Int. Cl.
*H04J 7/00* (2006.01)

(52) U.S. Cl. .................. 370/212; 370/532; 370/535; 375/260

(58) Field of Classification Search .................. 370/212, 370/213, 276–296, 532, 535–545; 375/260, 375/257; 379/399.01; 315/308; 318/807
See application file for complete search history.

(56) References Cited

U.S. PATENT DOCUMENTS

| | | | | |
|---|---|---|---|---|
| 3,674,937 | A * | 7/1972 | Bellanger et al. | 370/212 |
| 4,063,200 | A * | 12/1977 | Mattern | 370/535 |
| 4,524,335 | A * | 6/1985 | Yokoyama | 332/110 |
| 4,739,309 | A | 4/1988 | Brauninger et al. | |
| 5,499,269 | A * | 3/1996 | Yoshino | 375/257 |
| 5,594,324 | A * | 1/1997 | Canter et al. | 323/282 |
| 5,694,428 | A * | 12/1997 | Campana, Jr. | 375/260 |
| 5,740,241 | A * | 4/1998 | Koenig et al. | 379/399.01 |
| 5,747,947 | A * | 5/1998 | Hak | 315/308 |
| 5,856,799 | A | 1/1999 | Hamasaki et al. | |
| 6,107,774 | A * | 8/2000 | Yamada et al. | 318/807 |
| 2003/0174737 | A1 * | 9/2003 | Tanabe | 370/536 |

FOREIGN PATENT DOCUMENTS

| | | |
|---|---|---|
| JP | 53-12215 | 2/1978 |
| JP | 57-44209 | 3/1982 |

(Continued)

*Primary Examiner*—Kwang B Yao
*Assistant Examiner*—Jeffrey M Rutkowski
(74) *Attorney, Agent, or Firm*—Cooper & Dunham LLP

(57) ABSTRACT

A signal transmitting apparatus includes a sending part and a receiving part. The sending part converts each width of a plurality of digital input signals into a voltage in accordance with a predetermined weight, generates a send signal by adding voltages converted from the plurality of digital input signals, and outputs the send signal. The receiving part receives the send signal from the sending part, compares the send signal with a plurality of predetermined voltages, generates each of the digital input signals, and outputs each of the digital input signals.

16 Claims, 30 Drawing Sheets

FOREIGN PATENT DOCUMENTS

| | | |
|---|---|---|
| JP | 61-235246 | 10/1986 |
| JP | 1-309448 | 12/1989 |
| JP | 2-185132 | 7/1990 |
| JP | 3-221696 | 9/1991 |
| JP | 4-91637 | 3/1992 |
| JP | 4-322140 | 11/1992 |
| JP | 5-122759 | 5/1993 |
| JP | 8-79075 | 3/1996 |
| JP | 11-355255 | 12/1999 |
| JP | 2002-101044 | 4/2002 |

* cited by examiner

| STATE | Ai(V) | Bi(V) | Vo(V) |
|---|---|---|---|
| M1 | 6 | 6 | 0(=V1) |
| M2 | 6 | 0 | 2(=V2) |
| M3 | 0 | 6 | 4(=V3) |
| M4 | 0 | 0 | 6(=V4) |

FIG.13

| STATE | Ai(V) | Bi(V) | VoA(V) |
|---|---|---|---|
| M4a | 0 | 0 | 4(=V3a) |
| M3a | 0 | 4 | 2(=V2a) |
| M2a | 4 | 0 | 0(=V1a) |
| M1a | 4 | 4 | 0(=V1a) |

FIG.16

| STATE | Ai(V) | Bi(V) | Ci(V) | VoB(V) |
|---|---|---|---|---|
| M5b | 0 | 0 | 0 | 4(=V5b) |
| M4b | 0 | 0 | 4 | 3(=V4b) |
| M3b | 0 | 4 | 0 | 2.4(=V3b) |
| M2b | 0 | 4 | 4 | 2(=V2b) |
| M1b | 4 | — | — | 0(=V1b) |

SIGNAL TRANSMITTING APPARATUS, POWER SUPPLYING SYSTEM, AND SERIAL COMMUNICATION APPARATUS

TECHNICAL FIELD

This disclosure generally relates to a signal transmitting apparatus for multiplexing a plurality of digital signals and sending and receiving the plurality of digital signals through a single signal line, a power supplying system for conducting each of controls of actuating and stopping a plurality of power supplying devices, an output voltage, an output current, and operation modes of the plurality of power supplying devices through a communication part, and a serial communication apparatus for conducting a serial communication, especially by a half-duplex communication.

DESCRIPTION OF RELATED ART

Conventionally, since a signal line is provided per each signal in order to send and receive a plurality of signals, the number of signal lines has been increased proportional to the number of signals and wirings among devices for sending and receive signals become more complicate. As a result, the devices become larger and expenses are increased. Accordingly, a serial communication for sending receiving data by a single signal, in which the plurality of signals are aligned in chronological order, is conducted. The number of signal lines is remarkably reduced by applying the serial communication. On the other hand, since the serial communication sends a signal by, converting into a serial data, a parallel-serial converting circuit is required for a sending part and a serial-parallel converting circuit is required for a receiving part. Accordingly, the circuit size is enlarged, a device size becomes bigger, and expenses are increased.

Moreover, since the plurality of signals are sent by a time-share, a transmission rate becomes lower. Furthermore, in a case of the serial communication, at least three signal lines are required for a data signal, a clock signal used as a shift signal, a load signal for latching to convert the serial signal sent in chronological order into an original parallel signal. Thus, in a case of a few signals for a transmission, the number of signals cannot be reduced and the circuit size is enlarged even if the serial communication is applied. In this case, there is no advantage. Therefore, for example, the Japanese Laid-Open Patent Application No. 11-355255 discloses a multiplexed data transmission device in that the data signal, the clock signal, and the load signal are multiplexed and a wave height of a signal waveform is changed to send a multiplexed signal through a single signal line.

As described above, the number of the signal lines becomes one line. However, since a plurality of data sets are sent to a data line in serial in chronological order, time is required for convert serial data to a parallel signal. Thus, a higher data transmission cannot be achieved. Still, the parallel-serial converting circuit is required for the sending part, and the serial-parallel converting circuit is required for the receiving part.

FIG. 1 is a block diagram illustrating a power supply apparatus being used conventionally and generally.

In a power supply apparatus 100 illustrated in FIG. 1, a power supplying part 101 is connected loads 102 through 104. Each of the loads 102 through 104 receives a power supply from the power supplying part 101. A controlling part 105 conducts various operation controls and condition settings such as an actuating operation and a stopping operation, a setting of an output voltage, a setting of an output current, and a switching operation for switching an operation mode from a regular mode to a low-power-consumption mode, with respect to the power supplying part 101. Moreover, the power supplying part 101 monitors a present electric current consumption value and the output voltage for each of the loads 102 though 104 and sends monitoring information to the controlling part 105. As a result, the controlling part 105 sends a new instruction to the power supplying part 101. As described above, a large amount of information is sent and received mutually between the controlling part 105 and the power supplying part 101.

FIG. 2 is a block diagram illustrating a conventional power supplying apparatus having a configuration in that a controlling part controls a plurality of power supplying parts.

In a power supply apparatus 110 shown in FIG. 2, a first power supplying part 112 is connected to loads 1a through 1c, a second power supplying part 113 is connected to loads 2a through 2c, and a third power supplying part 114 is connected to loads 3a through 3c, respectively. A controlling part 111 is connected to the first, second, and third power supplying parts 112 through 114, and directly controls each of the first, second, and third power supplying parts 112 through 114.

Recently, functions of electronic products are remarkably improved. Various circuits and components having various functions are used inside the electronic products. For example a large numbers of circuits and components such as a digital camera, a speaker, a microphone, a liquid crystal display unit, switches, a sending circuit, a receiving circuit, an audio circuit, a motor, an operating unit, a storage unit, and a like are used inside a cellular phone. Moreover, the digital camera itself mounted inside the cellular phone includes a large number of functional components.

In order to supply an electric power to a large number of circuits and components, for example, a voltage and current characteristics suitable for each of circuits and the components is required. Thus, it is difficult to conduct by one electric power circuit. In particular, since a power saving has been demanded, instead of supplying the electric power to all circuits inside the electric products, it becomes common to restrain power supplies to unused circuits and components based on a use condition of the electric product, and to minimize the power consumption of a power supply circuit itself for supplying the electric power to these circuits and components.

Moreover, an overcurrent preventing circuit and a short protecting circuit are provided to each of the power supplying parts 112 through 114, so that an action is informed to each of the controlling parts 105 and 110 when the overcurrent preventing circuit and the short protecting circuit are activated and then, an operation is determined as the electric product. Therefore, conventionally, information sent and received between the controlling parts 111 and the power supplying parts 112 through 114 has been simply to control an activation and stop of the power supplying parts 112 through 114. Recently, an amount of the information is significantly increased and as a result, the number of signal lines is increased. In addition, when the number of the power supplying parts 112 through 114 is increased, the number of signal lines is increased by the increase of the number of the power supplying parts 112 through 114. This increase of the number of signal lines causes the electric products to be enlarged and an increase of an expense. In order to reduce the number of signal lanes between the controlling part 111 and the plurality of the power supplying parts 112 through 114, the Japanese Laid-Open Patent Application No. 4-322140 discloses a power supply control system 120 in that a controlling unit including a CPU (Central Processing Unit) is connected to a plurality of power supplying units, as shown in FIG. 3.

The power supply control system 120 includes a plurality of power supplying units PS1 through PS4, and a plurality of remote controllers RCD1 through RCD4 for controlling power ON and OFF of each of the plurality of power supplying units PS1 through PS4 and monitoring the plurality of power supplying units PS1 through PS4. The power supply control system 120 further includes a power controller MCD for outputting serial data configuring instruction data of each of selecting, turning on, shutting down, and monitoring the power supplying units PS1 through PS4 with respect to each of the remote controllers RCD1 through RCD4, and a serial bus SBUS connected between the power controller MCD and each of the remote controllers RCD1 through RCD4. The serial bus SBUS transmits each instruction data from the power controller MCD to each of the remote controllers RCD1 through RCD4 and power monitor data from each of the remote controllers RCD1 through RCD4 to the power controller MCD.

However, in the convention system described above, since the power controller MCD is separated from the remote controllers RCD1 through RCD4, ever if the convention system is realized by a minimum configuration, a serial bus is required. Therefore, it makes it difficult to minimize the system.

Conventionally, various methods for transmitting a digital signal by a serial communication have been known. One of typical methods is shown in FIG. 4 through FIG. 7.

In FIG. 4, a data signal SdA is the most common signal and shows data by a signal level. Data are extracted from the data signal SdA by using a synchronous signal SaA indicating a delimiter of a data block. In this method, two signals, that is, a data signal and a synchronization signal are required.

Next, in FIG. 5, the data signal SdB is a signal of which pulse width is modulated, and an interval of the data signal SdB is constant in that a pulse width when data shows "0" is different from a pulse width, when data shows "1". In this method, an interval of code may be concerned but it is possible to easily conduct an asynchronous operation. In addition, in FIG. 6, the data signal SdC is a signal in a pulse position modulating method in that a temporal position of the pulse is changed. Data are sampled by the synchronous signal SaC as a time base. In FIG. 7, a data signal SdD is a signal corresponding the pulse width modulation described above to the pulse position modulation. It should be noted that the interval of code is not the same but the data signal SdD is an asynchronous signal and the synchronous signal is not needed.

FIG. 8 is a schematic block diagram illustrating a conventional serial communication apparatus for conducing a half-duplex communication. In a serial communication apparatus 120 shown in FIG. 8, an host sending/receiving circuit 121 includes a first sending circuit part 122, a first receiving circuit part 123, and a first switching part 124 for conducting a sending right control. Similarly, a slave sending/receiving circuit 125 includes a second sending circuit part 126, a second receiving circuit part 127, and a second switching part 128 for conducting the sending right control. Basically, the first sending circuit part 122 is the same as the second sending circuit part 126 and the first receiving circuit part 123 is the same as the second receiving circuit part 127.

In a case in that the host sending/receiving circuit 121 has a sending right, data are transmitted from the first sending circuit part 122 of the host sending/receiving circuit 121 to the second receiving circuit part 127 of the slave sending/receiving circuit 125. When the sending right is moved to the slave sending/receiving circuit 125, data are transmitted from the second sending circuit 127 of the slave sending/receiving circuit 125 to the first receiving circuit part 123 of the host sending/receiving circuit 121.

However, as described above, conventionally, the synchronous signal in addition to the data signal is required. Even if the synchronous signal is not required, circuit configuration to generate a data signal from data and extract data from the data signal are complicated. Moreover, in order to conduct the half-duplex communication, the same as the host side is required for the slave side. Accordingly, a switching part for switching between a sending part and a receiving part is required. As a result, a circuit size and a circuit space become larger, and an expense is increased.

SUMMARY

In an aspect of this disclosure, there is provided a signal transmitting apparatus for multiplexing a plurality of digital signals and sending and receiving the plurality of digital signals through a single signal line, a power supplying system for conducting each of controls of actuating and stopping a plurality of power supplying devices, an output voltage, an output current, and operation modes of the plurality of power supplying devices through a communication part, and a serial communication apparatus for conducting a serial communication, especially by a half-duplex communication, in which the above-mentioned problems are eliminated.

In another aspect of this disclosure, there is provided a signal transmitting apparatus for transmitting a plurality of data sets by a single signal line without a parallel-serial conversion at a sending part and a serial-parallel conversion at a receiving part.

In another aspect of this disclosure, there is provided a power supplying system that can reduce an increase of the number of signal lines connecting a controlling part and a power supplying part even if the number of the power supplying parts is increased and an amount of information to send and receive between the power supplying parts and the controlling part.

In another aspect of this disclosure, there is provided a serial communication apparatus, which is minimized and realized by less expense in that a synchronous signal is not needed, each of a sending circuit and a receiving circuit at a host side and a slave side can be realized by a simple circuit configuration, a circuit load at the slave side can be reduced, and a switching part for switching between the sending circuit and the receiving circuit is not needed.

In another aspect of this disclosure, there is provided a signal transmitting apparatus for sending and receiving a plurality of digital input signals input to the signal transmitting apparatus through a single signal line, the signal transmitting apparatus including: a sending part for converting each width of the plurality of digital input signals into a voltage in accordance with a predetermined weight, generating a send signal by adding voltages converted from the plurality of digital input signals, and outputting the send signal; and a receiving part for receiving the send signal from the sending part, comparing the send signal with a plurality of predetermined voltages, generating each of the digital input signals, and outputting the each of the digital input signals.

In another aspect of this disclosure, there is provided a power supplying system for supplying a power from a plurality of power supplying devices to each of a plurality of loads, the power supplying system including: a first power supplying device including a first power supplying part for supplying a power to at least one of the plurality of loads, a controlling part for conducting an operation control of the first power supplying part, and a first communicating part for sending and receiving a signal to and from the controlling part; and at least one second power supplying device including a second power supplying part for supplying a power to at least one of the plurality of loads, and a second communicating part for sending and receiving a signal to and from the second power supplying part, wherein the first communicating part and the second communicating part send and receive signals each other, and the controlling part conducts the operation control of the second power supplying part through the first communicating part and the second communicating part.

In another aspect of this disclosure, there is provided a power supplying system for supplying a power from a plurality of power supplying devices to each of a plurality of loads, the power supplying system including: a first power supplying device including a first power supplying part for supplying a power to at least one of the plurality of loads, a controlling part for conducting an operation control of the first power supplying part, and a first communicating part for sending and receiving a signal to and from the controlling part; and at least one second power supplying device including a second power supplying part for supplying a power to at least one of the plurality of loads, and a second communicating part for sending and receiving a signal to and from the second power supplying part, wherein the first communicating part and the second communicating part send and receive signals each other, and the controlling part conducts the operation control of the second power supplying part through the first communicating part and the second communicating part.

In another aspect of this disclosure, there is provided a serial communication apparatus for conducting a serial communication by a half-duplex communication between a first sending/receiving circuit and a second sending/receiving circuit in that at least one first sending/receiving circuit is connected to at least one second sending/receiving circuit through a transmission channel, wherein each of the first sending/receiving circuit and the second sending/receiving circuit includes: a sending circuit part for generating a serial data signal by superimposing a predetermined superimposing pulse over a send data signal having two values during a predetermined signal level, and outputting the serial data signal; and a receiving circuit part for receiving the serial data signal sent from the sending circuit part, and extracting the send data signal by extracting the superimposing pulse from the serial data signal.

BRIEF DESCRIPTION OF THE DRAWINGS

Other aspects, features, and advantages will become more apparent from the following detailed description when read in conjunction with the accompanying drawings, in which:

FIG. 10 is a diagram showing voltage values of output voltages Vo in combinations of signal levels of the digital input signals Ai and Bi shown in FIG. 9, according to the first embodiment of the present invention;

FIG. 13 is a diagram showing voltage values of output voltages VoA in combinations of signal levels of the digital input signals Ai and Bi shown in FIG. 12, according to the second embodiment of the present invention;

FIG. 16 is a diagram showing voltage values of output voltages VoB in combinations of signal levels of the digital input signals Ai, Bi, and Ci shown in FIG. 12, according to the second embodiment of the present invention;

DETAILED DESCRIPTION OF THE PREFERRED EMBODIMENTS

In the following, embodiments the present invention will be described with reference to the accompanying drawings.

First Embodiment

Figure 9:
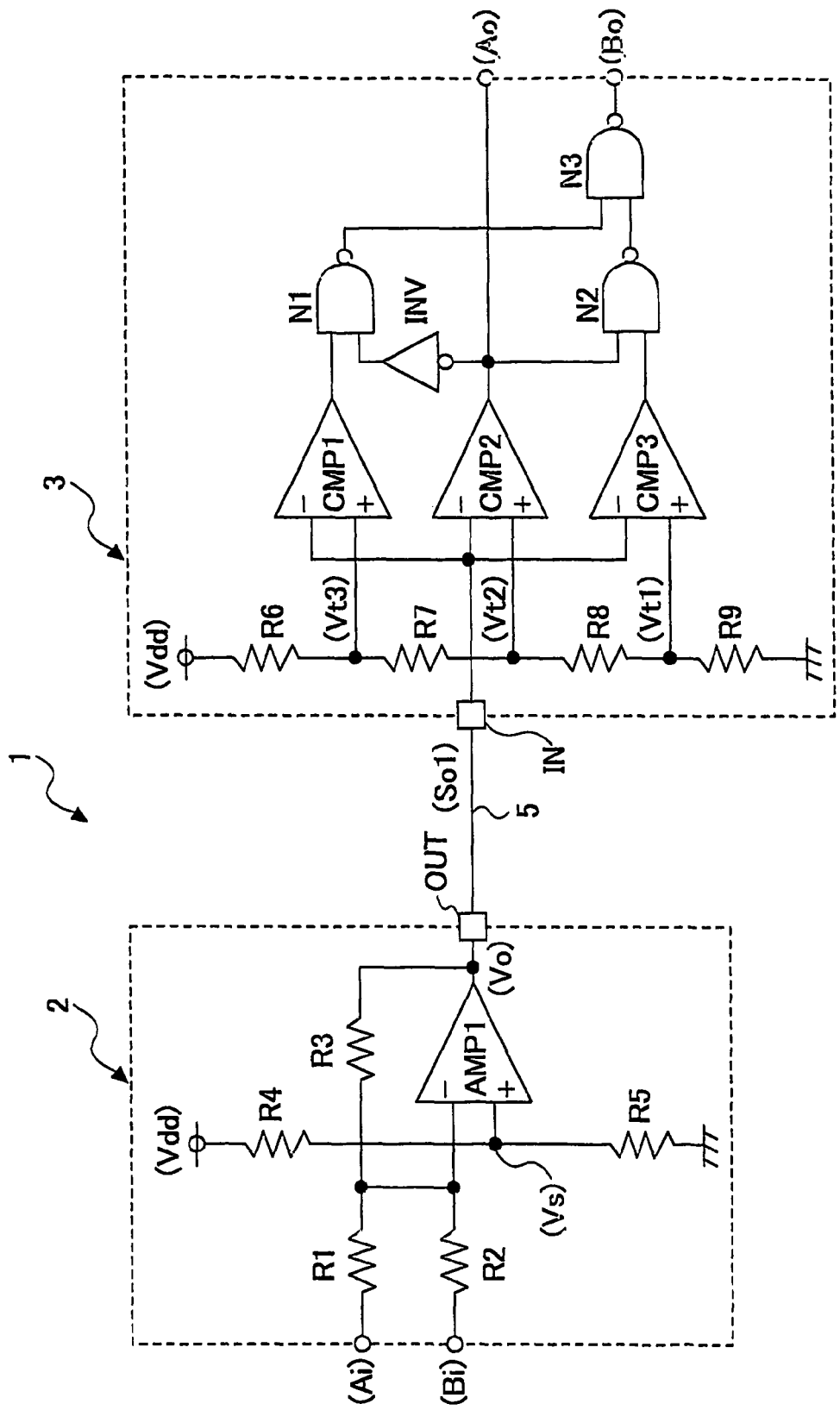
FIG. 9 is a diagram showing a circuit configuration of a signal transmitting apparatus according to a first embodiment of the present invention.

FIG. 9 is a diagram showing a circuit configuration of a signal transmitting apparatus according to a first embodiment of the present invention. In FIG. 9, for the sake of convenience, a case of multiplexing and transmitting two digital input signals is illustrated.

In FIG. 9, a signal transmitting apparatus 1 includes a sending part 2 which converts amplitude of digital input signals Ai and Bi input to the signal transmitting apparatus 1 into corresponding voltage in accordance with a predetermined weight, and generates and outputs a send signal So1 by adding each voltage converted from amplitude, and a receiving part 3 for receiving the send signal So1 from the sending part 2 through a signal line 5, for comparing the send signal So1 with each of predetermined reference voltages Vt1 through Vt3, and for generating and outputting digital input signals Ai and Bi based on a comparison result.

The sending part 2 includes an inversion amplifying circuit configured of an operational amplifier AMP1 and resistors R1 through R5. The digital input signal Ai is input to inverting input terminal of the operational amplifier AMP1 through the resistor R1 having an input resistance. The digital input signal Bi is input to the inverting input terminal of the operational amplified AMP1 through the resistor R2 having an input resistance. On the other hand, between a power voltage Vdd and an earth ground, the resistor R4 and the resistor R5 are connected n series, a connection portion for the resistors R4 and R5 is connected to a non-inverting input terminal of the operational amplifier AMP1, and a predetermined bias voltage Vs is input to the non-inverting input terminal of the operational amplifier AVP1. Moreover, the resistor R3 having a feedback resistance is connected between an output terminal of the operational amplifier AMP1 and an inverting input terminal and the output terminal of the operational amplifier AMP1 is connected to the send terminal OUT of the sending part 2. The send terminal OUT is connected to a receive terminal IN of the receiving part 3 by the signal line 5.

Next, the receiving part 3 includes voltage comparators CMP1 through CMP3, NAND circuits N1 through N3, an inverter INV, and resistors R6 through R9. The resistors R6 through R9 configure reference voltage generating circuits, the voltage comparators CMP1 through CPM3 configure voltage comparing circuits, and the NAND circuits N1 through N3 and the inverter INV configure logic circuits. A signal input to the receive terminal IN is input to each inverting input terminal of the voltage comparators CMP1 through CPM3. The resistors R6 through R9 are connected in series between the power voltage Vdd and the earth ground. A connection portions of the resistor R6 and the resistor R7 is connected to the non-inverting input terminal of the voltage comparator CMP1, a connection portion of the resistor R7 and resistor R8 is connected to the nor-inverting input terminal of the voltage comparator CMP2, and a connection portion of the resistor R8 and the resistor R9 is connected to the non-inverting input terminal of the voltage comparator CMP3.

The output terminal of the voltage comparator CMP1 is connected to the input terminal at one side of the NAND circuit N1, and the output terminal of the voltage comparator CMP2 is an output terminal at one side of the receiving part 3 and is connected to the input terminal at another side of the NAND circuit N1. Moreover, the output terminal of the voltage comparator CMP2 is connected to the input terminal at one side of the NAND circuit N2, and the output terminal of the voltage comparator CMP3 is connected to the input terminal at another side of the NAND circuit 2. The output terminals of the NAND circuits N1 and N2 are connected to relative input terminals of the NAND circuit N3, and the output terminal of the NAND circuit N3 is the output terminal at another side of the receiving part 3.

In this configuration, the voltage Vo of the send signal So1 output from the send terminal OUT of the sending part 2 is expressed by the following a formula (1):

$$Vo = Vs - R3 \times \{(VAi - Vs)/R1\} + (VBi - Vs)/R1\}\} \quad (1)$$

In the formula (1), R1 represents a resistance value of the resistor R1, R3 represents a resistance value of the resistor R3, Vai represents a voltage at a high level or a low level of the digital input signal Ai, and Vbi represents a voltage at a high level or a low level of the digital input signal Bi.

The power voltage Vdd is 6V, the bias voltage Vs is 3V, the resistance value of the resistor R1 is 15 kΩ, the resistance value of the resistor R2 is 30 kΩ, and the resistance value of the resistor R3 is 10 kΩ. In addition, in the digital input signals Ai and Bi, each voltage at the high level is 6V and is 0V at the low level. In this case, the output voltage Vo by each combination of signal levels of the digital input signals Ai and Bi becomes as shown in FIG. 10. In a case in that the bias voltage Vs is set to be half the power voltage Vdd, a resistance ratio of the resistor R1 to the resistor R2 is set to be 1:2, and the resistance value of the resistor R3 is set to be equal to a combined resistance value when the resistor R1 is connected to the resistor R2 in parallel, as shown in FIG. 10, the output voltage Vo is obtained as an even voltage difference with respect to each combination of voltages of the digital input signal Ai and the digital input signal Bi. This relationship is stable even if the number of the input signals is increased.

That is, in FIG. 10, in a case of a state M1 in that both the digital input signals Ai and Bi are the high level, the output voltage Vo becomes 0V of a predetermined value V1. And in a case of a state M2 in that the digital input signal Ai is the high level and the digital input signal Bi is the low level, the output voltage Vo is 2V of a predetermined value V2. Moreover, in a case of a state M3 in that the digital input signal Ai is the low level and the digital input signal Bi is the high level, the output voltage Vo is 4V of a predetermined value V3. Furthermore, in a case of a state MA in that the digital input signal Ai and Bi are the low level, the output voltage Vo is 6V of a predetermined value V4.

Figure 11:
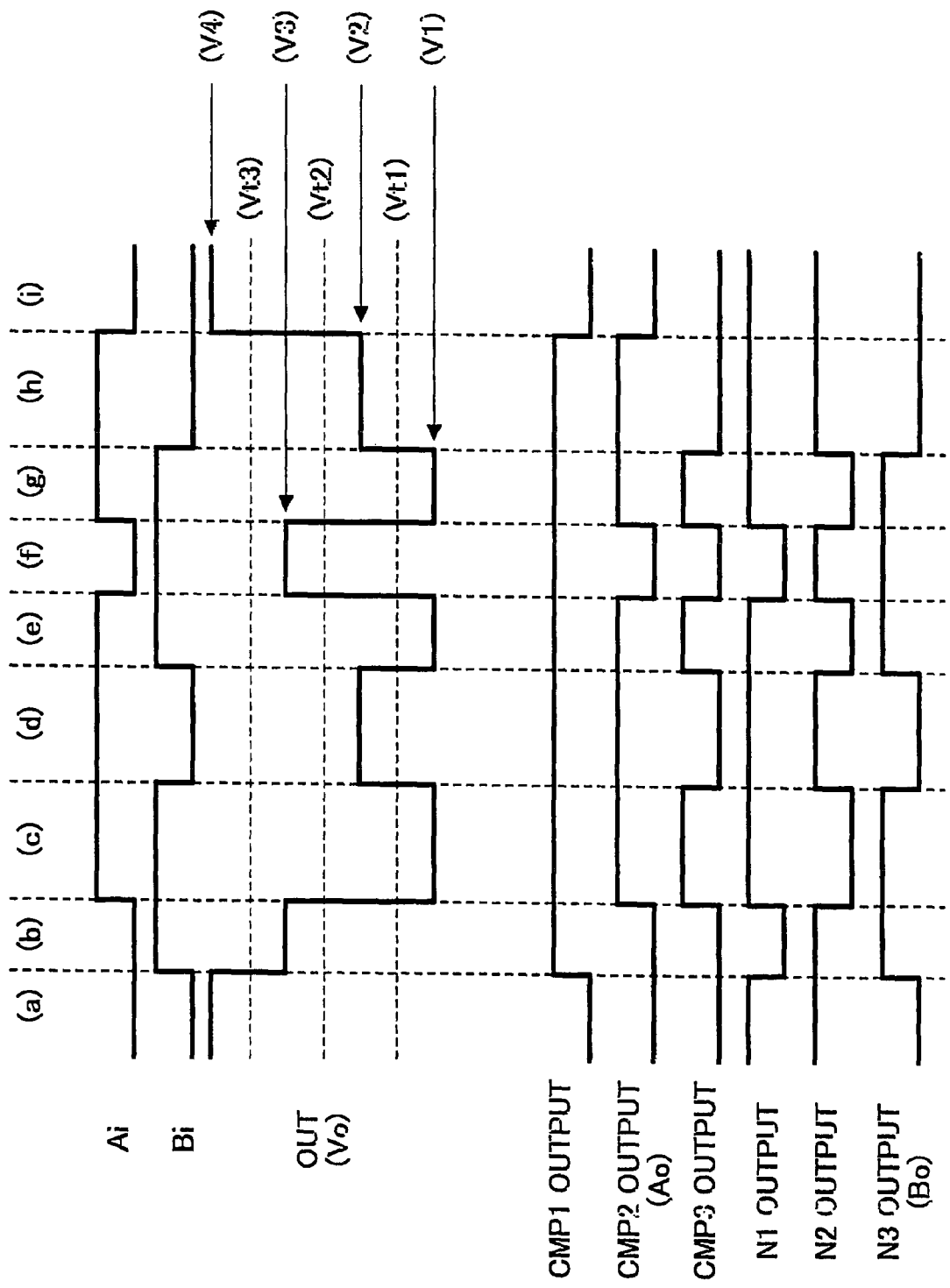
FIG. 11 is a timing chart diagram showing a waveform of a signal of each part shown in FIG. 9, according to the first embodiment of the present invention.

FIG. 11 is a timing chart diagram showing a waveform of a signal of each part shown in FIG. 9.

In FIG. 11, in a section (a) of the low level of both the digital input signal Ai and the digital input signal Bi, the output voltage Vo is 6V. When the digital input signal Bi becomes the high level in a section (b), the output voltage Vo becomes 4V. When, the digital input signal Ai becomes the high level in a section (c), the output voltage Vo becomes 0V. Next, when the digital input signal Bi becomes the low level in a section (d), the output voltage Vo is 2V. After a section (d), in sections (e), (f), (g), (h), and (i), the voltage value of the output voltage Vo is changed each time the signal levels of the digital input signal Ai and the digital input signal Bi are changed. In addition, with respect to all combinations of the signal levels in the digital input signal Ai and the digital input signal Bi, the output voltage Vo output a different voltage value.

Next, in the receiving part 3, each voltage value of the resistors R6 through R9 is set so that a reference value Vt1 is 1V, a reference voltage Vt2 is 3V, and a reference voltage Vt3 is 5V. That is, the reference value Vt1 is set to be an intermediate value of the output voltages Vo of the state M1 and the state M2 shown in FIG. 10, the reference value Vt2 is set to be an intermediate value of the output voltages Vo of the state M2 and the state M3 shown in FIG. 10, and the reference value Vt3 is set to be an intermediate value of the output voltages Vo of the state M3 and the state M4 shown in FIG. 10.

As seen from FIG. 11, the same signal as the digital input signal Ai is output from the output terminal of the voltage comparator CMP2. When the output signal Ao is the high level, the sane signal as the digital input signal Bi is output from the output terminal of the voltage comparator CMP3 and is output from the NAND circuit N2. Moreover, when the output signal Ao is the low level, the same signal as the digital input signal Bi is output from the output terminal of the voltage comparator CMP1 and is output from the NAND circuit N1. The output signals of the NAND circuits N1 and N2 are synthesized by the NAND circuit N3, and the same signal as the digital input signal Bi is output as the output signal Bo.

As described above, in the signal transmitting apparatus 1, the sending part 2 converts amplitude of the digital input signals Ai and Bi into a voltage in accordance with a predetermined weight [such as R3/R1 in formula (1)], adds all converted voltages, generates different predetermined voltages V1 through V4, respectively, and transmits a signal to the receiving part 3. The receiving part 3 conducts a voltage comparison for the signal received from the sending part 2 by using the predetermined reference voltages Vt1 through Vt3, generates the output signal Ao being the same as the digital input signal Ai and the output signal Bo being the same as the digital input signal Bi from the comparison result, and outputs the output signal Ao and the output signal Bo. Accordingly, it is possible to reproduce all digital input signals at the same time. Since the delay by the conventional serial-parallel conversion is eliminated, it is possible to conduct a signal process at higher speed.

In the first embodiment, the case of two digital input signals is illustrated and described. Since this case is just an example, the present invention is not limited to this case but can be applied to a plurality of digital input signals. Moreover, in the first embodiment, the case in that each of the resistance values is weighted by a multiple of two. Since this case is just an example, the present invention is not limited to this case.

Second Embodiment

In a case of sending a signal to a specific circuit and there is an enable signal to enable the specific circuit, if other control signals are multiplexed and transmitted only when the enable signal becomes active, it is possible to multiplex the control signals by a simple circuit. That is, in the first embodiment, the sending part 2 can multiplex and transmit the digital input signals Ai and Bi to the receiving part 3 only when the digital input signal Ai is the low level and the high level. This configuration will be described as a second embodiment of the present invention.

Figure 12:
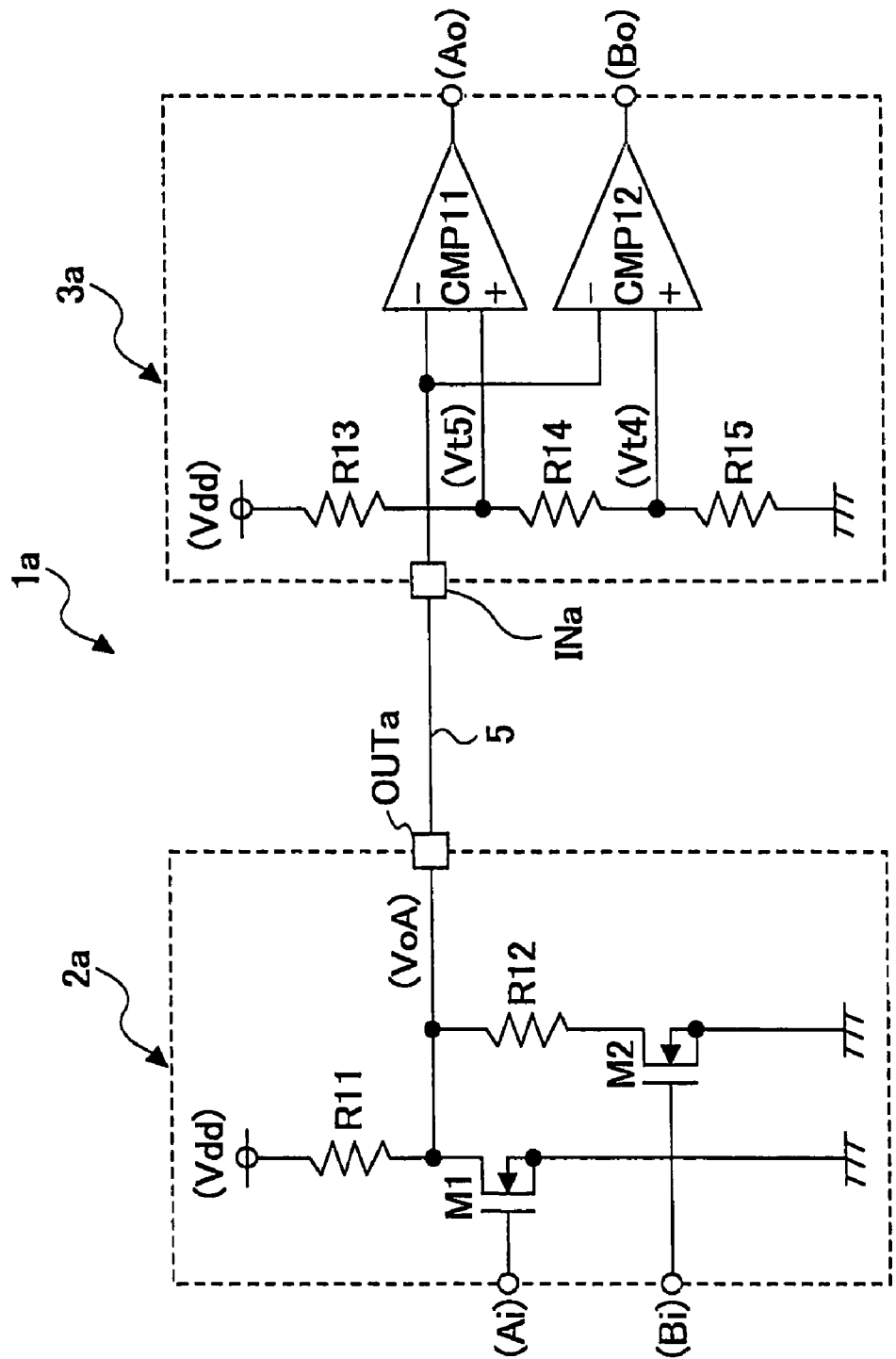
FIG. 12 is a diagram illustrating a circuit configuration of a signal transmitting apparatus according to a second embodiment of the present invention.

FIG. 12 is a diagram illustrating a circuit configuration of a signal transmitting apparatus according to the second embodiment of the present invention. In FIG. 12, parts that parts that are the same as those shown in FIG. 9 are given the same reference numbers. Also, in FIG. 12, for the sake of convenience, the case of multiplexing and transmitting two digital input signals is illustrated and described.

In FIG. 12, for example, the signal transmitting apparatus 1a includes a sending part 2a and a receiving part 2b. The sending part 2a converts amplitude of the digital input signal Bi when the digital input signal Ai is the row level, into each voltage in accordance with a predetermined weight, in which the amplitude is converted by a greatest weight n two digital input signals Ai and Bi. Also, the sending part 2a generates a send signal SoA by adding the converted voltages of the digital input signal Bi to the converted voltages of the low level of the digital input signal Ai. The receiving part 3a receives a send signal SoA from the sending part 2a through the signal line 5, compares the send signal SoA as a receive signal with each of predetermined reference voltages Vt4 and Vt5, generates the digital input signals Ai and Bi based on a comparison result, and outputs the digital input signals Ai and Bi.

The sending part 2a includes NMOS (N-channel MOS) transistors M1 and M2 configuring switching circuits and resistors R11 and R22 configuring load resistances. The digital input signal Ai is input to a gate of the NTMOS transistor M1, and the digital input signal Bi is input to a gate of the NMOS transistor M2. On the other hand, the resistor R11 and the NMOS transistor M1 are connected in series between the power voltage Vdd and the earth ground, and a series circuit of the resistor R12 and the NMOS transistor M2 is connected to the NMOS transistor M1 in parallel. A connection portion of the NMOS transistor M1 and the resistors R11 and R12 is connected to a sending terminal OUT of the sending part 2a. The sending terminal OUTa is connected to a receiving terminal Ina of the receiving part 3a by the signal line 5.

Next, the receiving part 3a includes voltage comparators CMP11 and CMP12 and resistors R13 through R15. The resistors R13 through R15 configure reference voltage generating circuits, the voltage comparators CM11 and CMP12 configure voltage generating circuits, and the voltage comparators CMP11 and CMP12 configure voltage comparing circuits. Each wiring line connected to each output terminal of the voltage comparators CMP11 and CMP12 configures a pseudo logic circuit. A signal input to a receiving terminal INa is input to each inverting input terminal of the voltage comparators CMP11 and CMP12. The resistors R13 through R15 are connected in series between the power voltage Vdd and the earth ground. A connection portion of the resistor R13 and the resistor R14 is connected to a non-inverting input terminal of the voltage comparator CMP11, and a connection portion of the resistor R14 and the resistor R15 is connected to a non-inverting input of the voltage comparator CMP12. The output terminal of the voltage comparator CMP11 configures one output terminal of the receiving part 3a and the output terminal of the voltage comparator CMP12 configures another output terminal of the receiving part 3a.

In this configuration described above, in a case in that the power voltage Vdd is set to be 4V and a resistance value of the resistor R11 is the same as a resistance value of the resistor R12, an output voltage VoA corresponding to each combination of signal levels of the digital input signal Ai and Bi becomes as shown in FIG. 13. As seen from FIG. 13, by setting the resistance value of the resistor R11 to be the same as the resistance value of the resistor R12, amplitudes of the digital input signals Ai and Bi are evenly changed.

That is, in FIG. 13, in a case of a state M4a in that both the digital input signals Ai and Bi are the low level, the output voltage VoA becomes 4V of a predetermined value V3a. And in a case of a state M3a in that the digital input signal Ai is the Low level and the digital input signal Bi is the high level, the output voltage VoA becomes 2V of a predetermined value V2a. Moreover, in a case of a state M2a in that the digital input signal Ai is the high level and the digital input signal Bi is the high level an in a case of a state M1a in that both the digital input signals Ai and Bi are the high level, the output voltage VoA becomes 0V of a predetermined value V1a.

Figure 14:
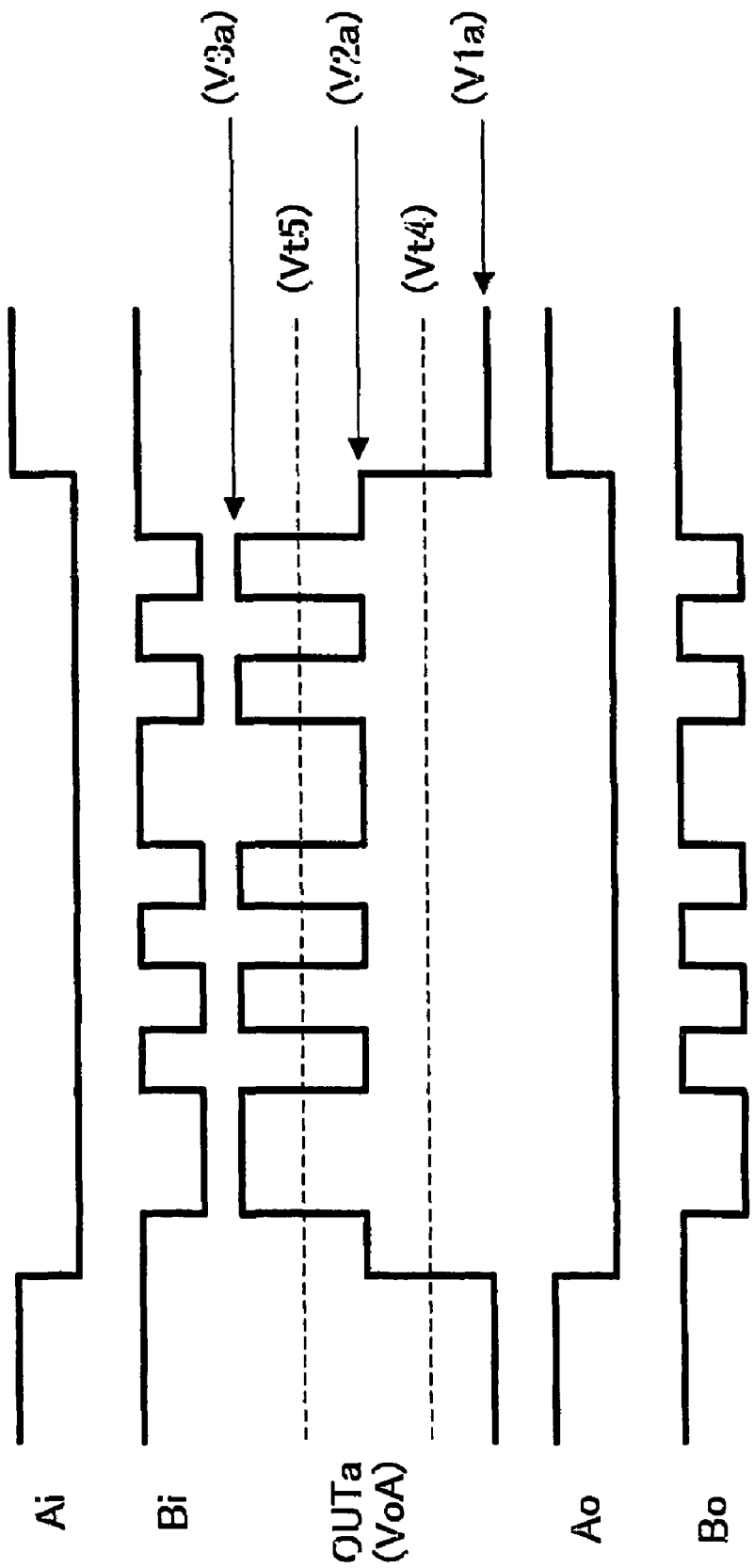
FIG. 14 is a timing chart diagram showing a waveform of a signal of each part shown in FIG. 12, according to the second embodiment of the present invention.

FIG. 14 is a timing chart diagram showing 2 waveform of a signal of each part shown in FIG. 12. Each operation of parts shown in FIG. 12 will be described in detail with reference to FIG. 14.

When the digital input signal Ai is the high Level (4V), the NMOS transistor M1 as a switching device is turned on and 0V of the send signal SoA is output from the send terminal OUTa. When the digital input signal Ai becomes the low level (0V) 2V or 4V corresponding to the signal level of the digital input signal Bi is output from the send terminal OUTa as the send signal SoA. That is, in a case in that the digital input signal Ai is the low level, the send signal SoA becomes 4V when the digital input signal Bi is the low level (0V), and the send signal SoA becomes 2V when the digital input signal Bi is the high level (4V).

On the other hand, in the receiving part 3a, the resistance values of the resistors R13 through R15 are set so that the reference voltage Vt4 becomes 1V and the reference voltage Vt5 becomes 3V, that is, the reference voltage Vt4 becomes an intermediate value between the predetermined value V1a and the predetermined value V2a becomes an intermediate value between the predetermined V2a and the predetermined value V3a. As seen from FIG. 14, the voltage comparator CMP11 outputs the output signal Bo having a signal level corresponding to the comparison result from comparing the output voltage VoA and the reference voltage Vt5, and the output signal Bo becomes the same signal as the digital input signal Bi. Also, the voltage comparator CMP12 outputs the output signal Ao having a signal level corresponding the comparison result from comparing the output voltage VoA and the reference voltage Vt4.

In a case in that the digital input signal Ai is the high level and the digital input signal Bi is multiplexed, in FIG. 12, simply, the signal level of the digital input signal Ai is inverted by and inverter and is input to the gate of the NMOS transistor M1. Alternatively, the NMOS transistors M1 and M2 may be replaced with a PMOS transistor. As described above, it is possible to transmit a signal by a simple circuit configuration in the case of multiplexing two signals.

The case of multiplexing two input signals is described with reference to FIG. 12 through FIG. 14. In FIG. 12 through FIG. 15, parts that are the same as those shown in FIG. 12 are given the same reference numbers and the explanation thereof will be omitted. Differences from FIG. 12 will be described.

Figure 15:
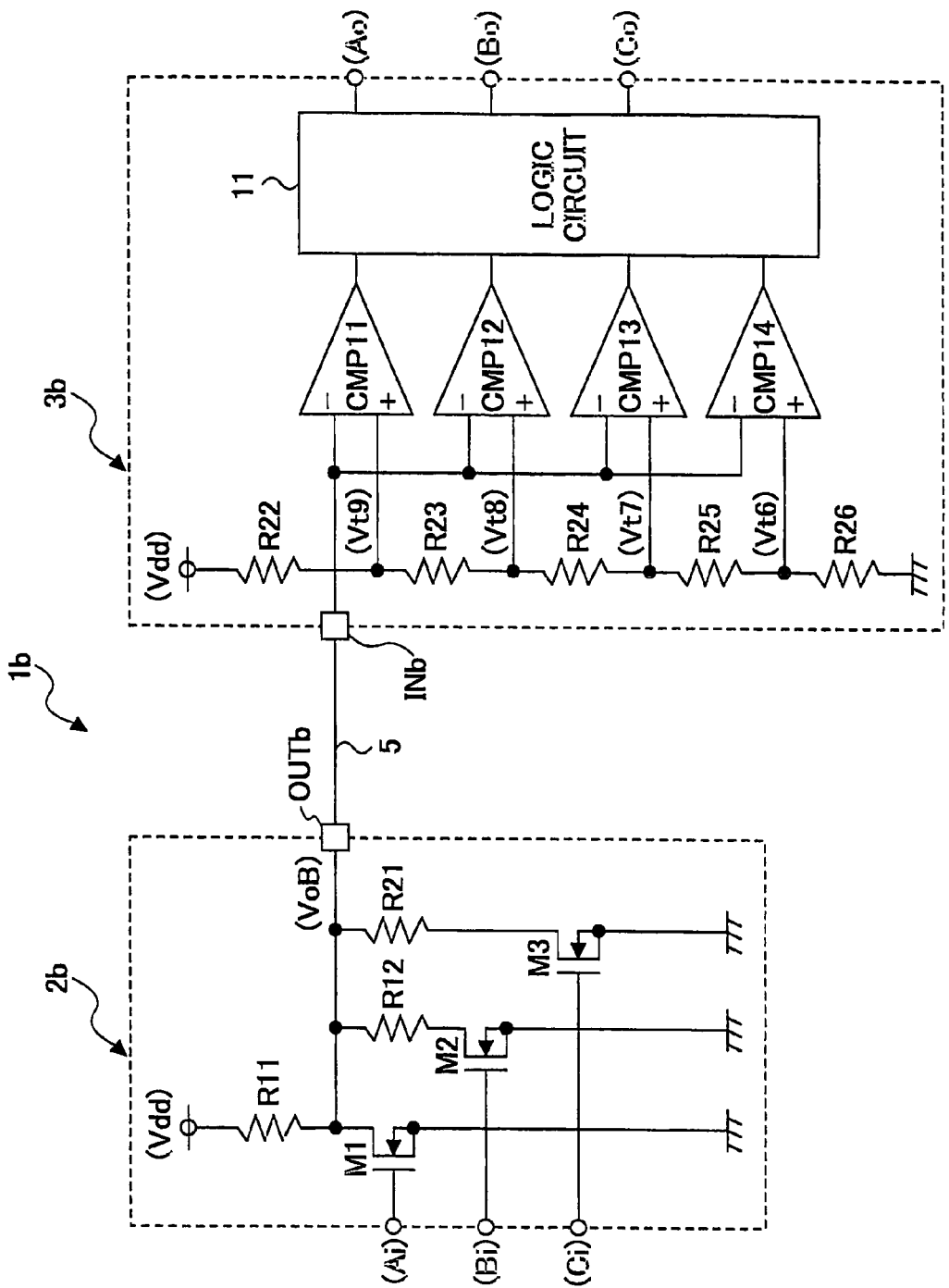
FIG. 15 is a diagram showing another circuit configuration of the signal transmitting apparatus according to the second embodiment of the present invention.

Different from FIG. 12, in FIG. 15, an NMOS transistor M3 and a resistor R21 are additionally provided to the sending part 2a shown in FIG. 12 as a switching device. Moreover, instead of the resistors R13 through R15 in the receiving part 3a shown in FIG. 12, resistors R22 through R26 are additionally provided, and the voltage comparators CMP13 and CMP14 and a logic circuit 11 are additionally provided to the receiving part 3a.

In FIG. 15, the signal transmitting apparatus 1b includes a sending part 2b and a receiving part 3b. The sending part 2b converts amplitude of each of the digital input signals Bi and Ci when the digital input signal Ai is the low level, into each voltage in accordance with a predetermined weight, in which the amplitude is converted by a greatest weight in three digital input signals Ai, Bi, and Ci. And the sending part 2b generates a send signal SoB by adding each voltage of the digital input signals Bi and Ci to a voltage at the low level of the converted digital input signal Ai, and outputs the send signal SoB. The receiving part 3b receives the send signal SoB from the sending part 2b through the signal line 5, compares the send signal SoB with each of predetermined Vt6 through Vt9, generates the digital input signal Ai, Bi, and Ci based on the comparison result, and outputs the digital input signal Ai, Bi, and Ci.

The sending part 2b includes NMOS transistors M1 through M3 configuring a switching circuit, and resisters R11, R12, and R21 each of which configures a load resistance. The digital input signal Ci is input to a gate of the NMOS transistor M3. Moreover, a series circuit of the NMOS transistor M2 is connected to a series circuit of the resistor R12 in parallel. A connection portion of the NMOS transistor M1 and the resistors R11, R12, and R21 is connected a sending terminal OUTb of the sending part 2b. The sending terminal OUTb is connected to a receiving terminal INb of the receiving part 3b by the signal line 5.

Next, the receiving part 3b includes voltage comparators CMP11 through CMP14, the resistors R22 through R26, and a logic circuit 11. The resistors R22 through R26 configure reference voltage generating circuits, and the voltage comparators CMP11 through CMP13 configure voltage comparing circuits. A signal input into the receiving terminal INb is input to each of the inverting input terminals of the voltage comparator CMP11 through CMP14. The resistors R22 through R26 are connected in series between the power voltage Vdd and the earth ground. A connection portion of the resistor R22 and the resistor R23 is connected to a non-inverting input terminal of the voltage comparator, and a connection portion of the resistor R23 and the resistor R24 is connected to a non-inverting input terminal of the voltage comparator CMP12.

Moreover, a connection portion of the resistor R24 and the resistor R25 is connected to a non-inverting input terminal of the voltage comparator CMP13, a connection portion of the resistor R25 and the resistor R26 is connected to a non-inverting input terminal of the voltage comparator CMP14. Each output terminal of the voltage comparators CMP 11 through CMP14 is connected to the logic circuit 11. The logic circuit 11 generates each of the digital input signal Ai, Bi, and Ci from each output signal of the four voltage comparators CMP11 through CMP14 and outputs each of the output signals Ao, Bo, and Co from corresponding output terminals of the receiving part 3b.

In this circuit configuration, in a case in that the power voltage Vdd is set to be 4V the resistor R11 is set to be 10kΩ, the resistor R11 is 15 kΩ, and the resistor R21 is set to be 30 kΩ, output voltages VoB corresponding to combinations of the signal levels of the digital input signal Ai, Bi, and Ci. As seen from FIG. 16, a resistance ratio of the resistance R12 and the resistance R21 is set to be 1:2, the resistor R12 is connected to the resistor R21 in parallel, and a combined resistance value is set to be approximately equal to a resistance value of the resistor R11, so that a voltage change of the output voltage VoB output from the sending terminal OUTb is made to be relatively greater.

On the other hand, each of the reference voltages Vt6 through Vt9 may be set to be an intermediate voltage of the output voltages VoB shown in FIG. 16. For example, in a case shown in FIG. 16, each resistance value of the resistors R22 through R26 is set so that the reference voltage Vt6 becomes 1V, the reference voltage Vt7 becomes 2.2V, the reference voltage Vt8 becomes 2.7V, and the reference voltage Vt9 becomes 3.5V. The logic circuit 11 generates each of the digital input signals Ai, Bi, and Ci from each output signal of the four voltage comparators CMP11 through CMP14, and outputs the digital input signals Ai, Bi, and Ci as output signals Ac, Bo, and Co.

As described above, the signal transmitting apparatus 1a according to the second embodiment, the sending part 2a converts amplitude of each digital input signal into a voltage in accordance with a predetermined weight only when a predetermined one input signal is the low level or the high level, generates different predetermined voltages by adding converted voltages, and transmits the different voltages to the receiving part 3b. The receiving part 3b conducts a voltage comparison to compare a signal received from the sending part 3b with each predetermined reference voltage, generates an output signal being the same as each of the digital input signals based on the comparison result, and outputs each output signal. Accordingly, the same effects as the first embodiment can be obtained in the second embodiment. Moreover, in a case in that only when an enable signal for enabling a specific circuit is active, other control signals are multiplexed and transmitted, it is possible to simplify a circuit configuration.

According to the present invention, in the signal transmitting apparatuses 1, 1a, and 1b, since the amplitude of each of the plurality of the digital input signals is converted into a voltage by a predetermined weight, and voltages of converted digital input signals are added and are transmitted, it is possible to transmit information of the plurality of the digital input signals by a single signal line. Therefore, it is possible to reduce a space for wiring lines and an expense. Moreover, it is possible to simultaneously all digital input signals at the receiving parts 3, 3a, and 3b, it is possible to eliminate a time loss for the conventional serial-parallel conversion, and it is possible to conduct a signal process at higher speed.

Moreover, in a case in that other digital input signals are transmitted only when the digital input signal having the greatest weight in the plurality of digital input signals is the signal level, which is either the high level or the low level, it is possible to realize and minimize a sending/receiving circuit by a simple configuration, and to reduce the expense of the sending/receiving circuit.

Third Embodiment

Figure 17:
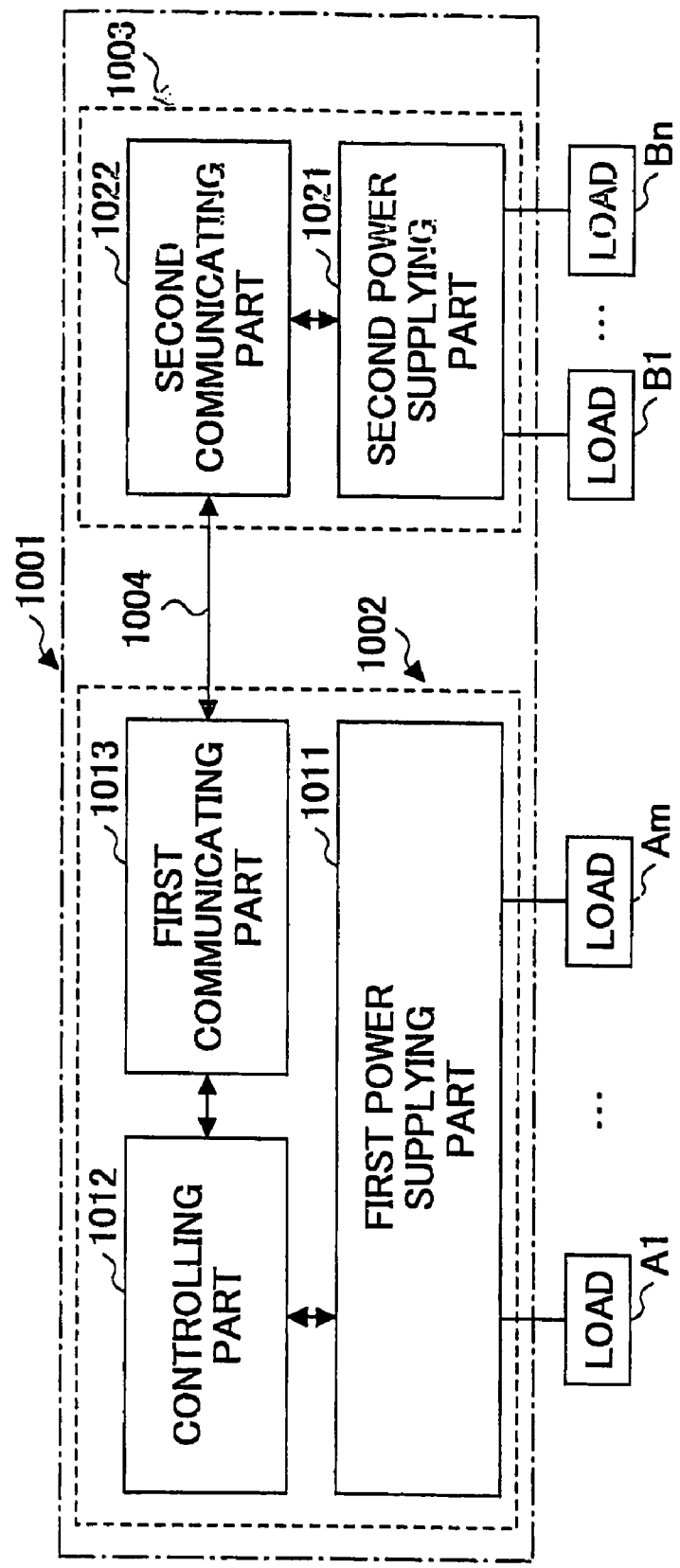
FIG. 17 is a block diagram Illustrating a power supplying system according to a third embodiment of the present invention.

FIG. 17 is a block diagram illustrating a power supplying system according to a third embodiment of the present invention.

In FIG. 17, the power supplying system 1001 includes a first power supplying unit 1002 for conducting a power supply to loads A1 through Am (m is an integer where m>0), and a second power supplying unit 1003 for conducting a power supply to loads B1 through Br (n is an integer where n>0). The first power supplying unit 1002 and the second power supplying unit 1003 are mutually connected by a communication line 1004.

The power supplying unit 1002 includes a first power supplying part 1011 for conducting a power supply to the loads A1 through Am, a controlling part 1012 for conducting an operation control of the first power supplying part 1011, and a first complicating part 1013 for communicating with the second power supplying unit 1003. Moreover, the second power supplying unit 1003 includes a second power supplying part 1021 for conducting a power supply to the loads B1 through Bn, and a second communicating part 1022 for communicating with the first power supplying unit 1002. The first communicating part 1013 and the second communicating part 1022 mutually send and receive a signal by using the communication line 1004. The controlling part 1012 conducts the operation control of the first power supplying part 1101 and also conducts the operation control of the second power supplying part 1021 through the first communicating part 1013 and the second communicating part 1022.

For example, the controlling part 1012 conducts various condition settings and operation controls such as a start and stop of the power supply, a voltage setting of a power to supply, a current setting of the power to supply, a switch from a regular operation mode to a low power consumption operation mode, and a like, with respect to the first power supplying part 1011 and the second power supplying part 1021. In addition, the controlling part 1012 receives information for each of the loads A1 through Am sent from the first power supplying part 1011 and the second power supplying part 1021, for example, information such as a present current consumption value, an output voltage value, and a like, and sends a new instruction to the first power supplying part 1011 and the second power supplying part 1021. As described above, the controlling part 1012 sends and receives information to and from the first power supplying part 1011 and the second power supplying part 1021, mutually.

A signal between the controlling part 1012 and the first power supplying part 1011 is directly sent and received. A signal between the controlling part 1012 and the second power supplying part 1021 is sent and received through the first communicating part 1013 and the second communication part 1022. The first communication part 1013 and the second communication part 1022 are mutually connected by the communication line 1004. The first communicating part 1013 and the second communicating part 1022 may be connected by any kind of communication part. A well-known technology can be used and may be either wired or wireless The first power supplying unit 1002 corresponds to a first power supplying device in claims, and the second power supplying unit 1003 corresponds to a second power supplying device in claims. The first power supplying part 1011 corresponds to a first power supplying part in claims, and the first communicating part 1013 corresponds to a first communication part in claims. The second power supplying part 1021 corresponds to a second supplying part in claims, and the second communicating part 1022 corresponds to a second communicating part in claims.

By this configuration, in a case in that a small size power supplying system is formed due to a fewer number of loads for conducting the power supply, it is possible to minimize the power supplying system by configuring by the first power supplying unit 1002 alone. Moreover, in order to correspond to a product size such as the number of loads for conducting the power supply, it is possible to correspond to a case of conducting a complicated power supply by adding the second power supplying unit 1003.

In addition, in order to control the second power supplying part 1021, simply, only a signal line may be connected between the first communicating part 1013 and the second communication part 1022, so that it is possible to easily wire lines within a product using the power supplying system 1001. Moreover, a serial communication can be used for a communication between the first communicating part 1013 and the second communicating part 1022, so that it is possible to reduce the number of signal lines. Therefore, it is possible to minimize the product using the power supplying system 1001 and reduce the expense. Furthermore, the communication between the first communicating part 1013 and the second communicating part 1022 can be realized by a radio transmission. Accordingly, the signal line is not needed, and it is possible to further minimize the power supplying system.

Figure 18:
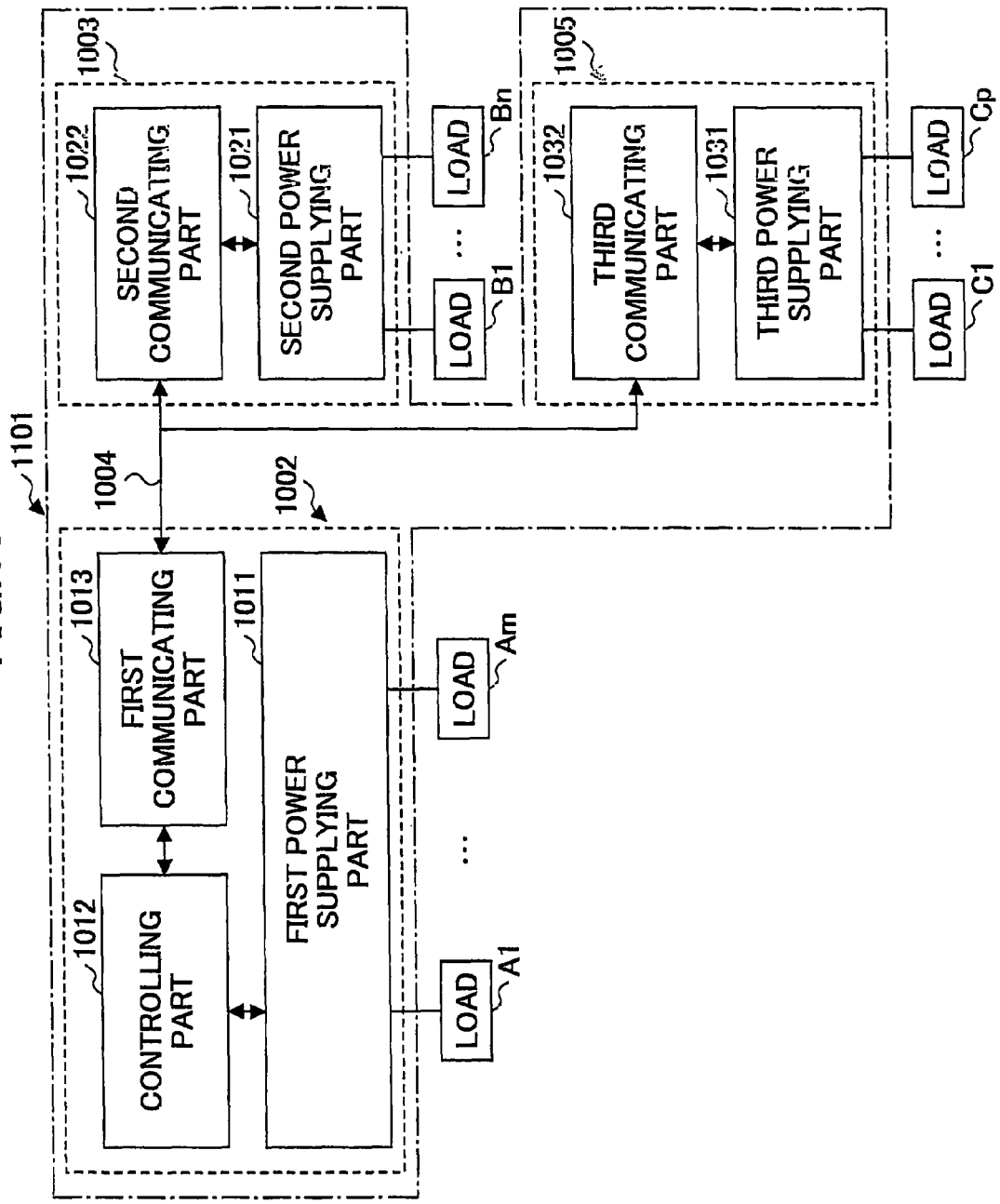
FIG. 18 is a block diagram illustrating another power supplying system according to the third embodiment of the present invention.

Next, in FIG. 17, a case in that a power supplying unit connected to the first power supplying unit 1002 is only the second power supplying unit 1003 is illustrated. Alternatively, a plurality of power supplying units may be connected to the first power supplying unit 1002. In this case, the configuration shown in FIG. 17 can be modified as shown in FIG. 18. In FIG. 18, a case in that two power supplying units are connected to the first power supplying unit 1002 is illustrated. In FIG. 18, parts that are the same as those shown in FIG. 17 are given the same reference numbers and the explanation thereof will be omitted. Differences from FIG. 17 will be described.

Different from the configuration shown in FIG. 17, in FIG. 18, a third power supplying unit 1005 is additionally provided.

In FIG. 18, a power supplying system 1101 includes she first power supplying unit 1002, the second power supplying unit 1003, and the third power supplying unit 1005 for conducting the power supply to loads C1 through Cp (p is an integer where p>0). The first power supplying unit 1002, the second power supplying unit 1003, and the third power supplying unit 1005 are connected to the communication line 1004. The third power supplying unit 1005 includes a third power supplying part 1031 for conducting the power supply to loads C1 through Cp, and a third communicating part 1032 for communicating with the first power supplying unit 1002. The first through the third communicating parts 1013, 1022, and 1032 mutually communicate by using the communication line 1004. The controlling part 1012 conducts the operation controls of the first power supplying part 1011 and the second power supplying part 1021, and also conducts the operation control of the third power supplying part 1031 through the first communicating part 1013 and the third communicating part 1032.

For example, the controlling part 1012 conducts various condition settings and operation controls such as a start and stop of the power supply, a voltage setting of a power to supply, a current setting of the power to supply, a switch from a regular operation mode to a low power consumption operation mode, and a like, with respect to each of the first, second, and third power supplying parts 1011, 1021, and 1031. Also, the controlling part 1012 receives information for each of the loads A1 through Am, Bi through Bn, and C1 through Cp sent from the first power supplying part 1011, the second power supplying part 1021, and the third power supplying part 1031, for example, information such as a present current consumption value, an output voltage value, and a like, and sends a new instruction to the first power supplying part 1011, the second power supplying part 1021, and the third power supplying part 1031. As described above, the controlling part 1012 sends and receives information to and from the first power supplying part 1011, the second power supplying part 1021, and the third power supplying part 1031, mutually.

A signal between the controlling part 1012 and the third power supplying part 1031 is received and sent through the first communicating part 1013 and the third communicating part 1032. The first, second, and third communicating parts 1013, 1022, and 1032 are connected by the communication line 1004. The first, second, and third communicating parts 1013, 1022, and 1032 may be connected by any kind of a communication part. A well-known technology can be used and may be either wired or wireless. The third power supplying unit 1005 corresponds to the second power supplying device in claims, the third power supplying part 1031 corresponds to the second power supplying part in claims, and the third communicating part 1032 corresponds to the second communicating part.

By this configuration, in order to correspond to the product size based on the number of loads for conducting the power supply, in addition to operating the first power supplying unit 1002, the first, second, and third power supplying units are combined to use. Accordingly, by combining the first, second, and third power supplying units 1002, 1003, and 1005, it is possible to realize a further complicated power supply.

Moreover, in order to control the third power supplying part 1031, only the signal line may be simply connected between the first communicating part 1013 and the third communicating part 1032. Therefore, it is possible to easily wire lines within the product using the power supplying system 1101. Furthermore, a serial communication can be used for a communication between the first communicating part 1013 and each of the second communicating part 1022 and the third communicating part 1032, so that it is possible to reduce the number of signal lines. Therefore, t is possible to minimize the product using the power supplying system and reduce the expense. In addition, a radio transmission can be used for a communication between the first communicating part 1013 and each of the second communicating part 1022 and the third communicating part 1032, so that the signal line is not needed. Therefore, it is possible to further minimize the product using the power supplying system.

As described above through the communication line 1004, an instruction from the controlling part 1012 provided to the first power supplying unit 1002 is sent to each of the power supplying units 1003 and 1005. Accordingly, various conditions can be set for each of the power supplying units 1003 and 1005. On the other hand, information from each of the power supplying units 1003 and 1005 is sent to the first power supplying unit 1002. Then, the controlling part 1012 receives the information and generates a next Instruction. By this configuration, it is possible to realize the power supplying system 1101 by a simple configuration for any size of the product. Moreover, by using communication parts for an external communication of the power supply system 1101, it is possible to control an option apparatus externally provided to the power supply system 1101 and a power supplying unit of a parallel operation of the same system.

As described above, the power supply systems 1001 and 1101 according to the third embodiment, the first power supplying unit 1002 is connected to at least one of other power supplying units by the communication line 1004, and the operation control of the power supplying part within at least one power supplying unit is conducted. Accordingly, even if the number of the power supplying units is increase and an amount of information to send and receive between the power supplying units and the number of controlling part is increased, it is possible to reduce the number of signal lines to connect the controlling part and the power supplying units.

Fourth Embodiment in the third embodiment, the controlling part 1012 controls each power supplying part. Some products using the power supplying system includes a controlling part for controlling various functions being included in the product and controls the mower supplying part by the controlling part. In this case, it is ineffective to provide a special controlling circuit for controlling the power supplying part. Accordingly, the controlling part 1012 may be configured as one controlling unit separated from the first power supplying unit 1002. This configuration will be described as a fourth embodiment.

Figure 19:
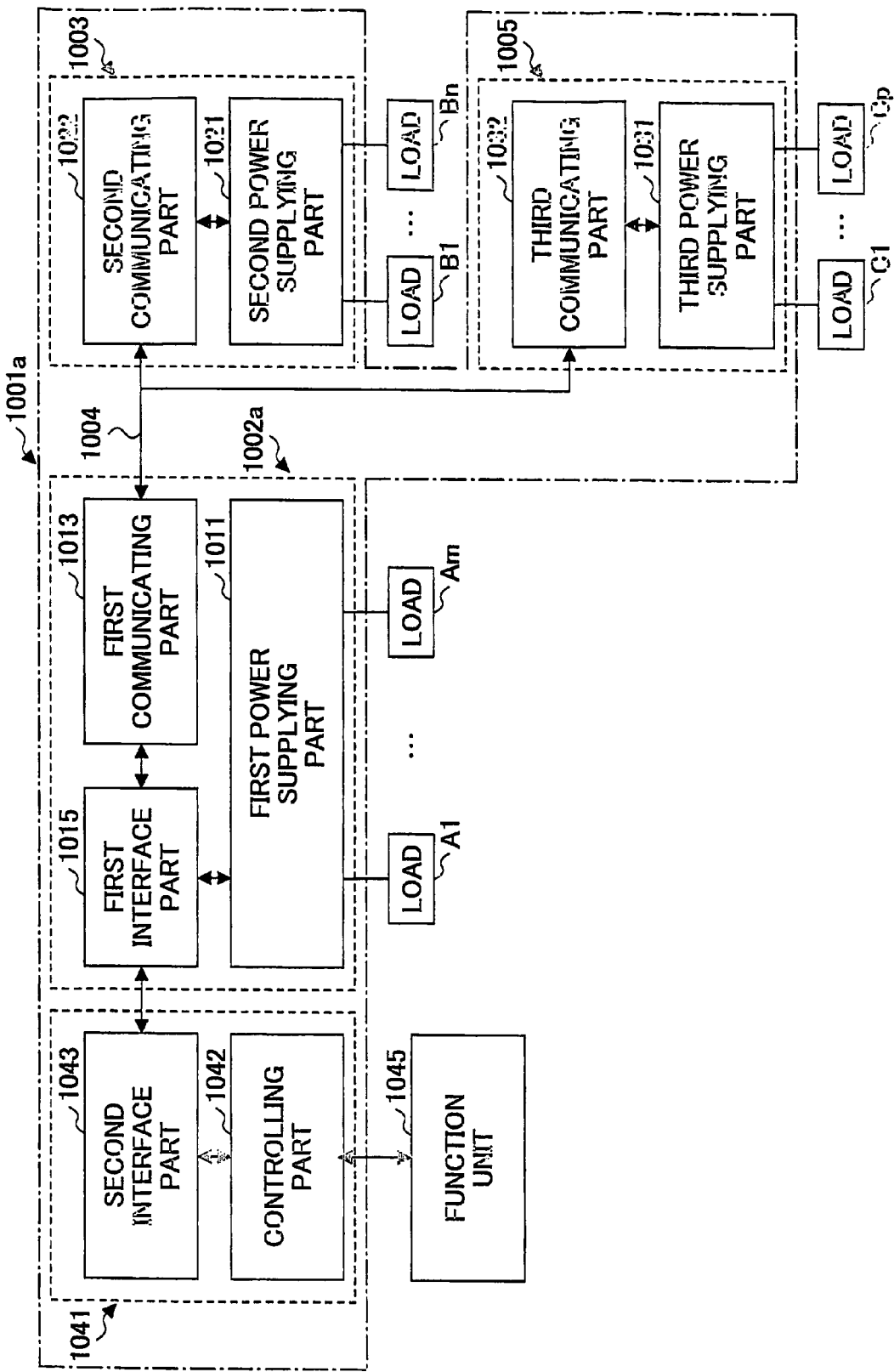
FIG. 19 is a block diagram illustrating a power supplying system according to a fourth embodiment of the present invention.

FIG. 19 is a block diagram illustrating a power supplying system according to the fourth embodiment of the present invention. In FIG. 19, parts that are the same as those shown in FIG. 18 are given the same reference numbers and the explanation thereof will be omitted. Differences from FIG. 18 will be described.

Different from the configuration shown in FIG. 18, in FIG. 19, the controlling part 1012 of the first power supplying unit 1002 is separately configured as a controlling unit 1041, an interface part for connecting the power supplying unit 1002 and the controlling unit 1041 is provided to each of the first power supplying unit 1002 and the controlling unit 1041. Accordingly, the first power supplying unit 1002 shown in FIG. 18 is configured as a first power supplying unit 1002*a* shown in FIG. 18, and the power supplying system 1001 shown in FIG. 18 is configured as a power supplying system 1001*a*.

In FIG. 19, the power supplying system 1001*a* includes the first power supplying unit 1002*a*, the second power supplying unit 1003, the third power supplying unit 1004, and a function unit including the first, second, and third power supplying part 1011, 1021, and 1031 and a predetermined function. The power supplying unit 1002*a* includes a first interface part 1015 for interfacing between the first power supplying part 1011 and the controlling unit 1041, and a first communicating part 1013. In addition, a controlling part 1042 for conducting operation controls of the first, second, and third power supplying parts 1011, 1021, and 1031, and the function unit 1045, and a second interface part 1043 for interfacing with the first power supplying unit 1002*a*.

The first and second interface parts 1015 and 1043 are connected each other and the first interface part 1015 and the first communicating part 1013 are connected each other. The controlling part 1042 and the function unit 1045 send and receive a signal directly each other. The controlling part 1042 sends and receives a signal to and from the first power supplying part 1011 through the second interface part 1043 and the first interface part 1015. Moreover, the controlling part 1042 sends and receives a signal to and from the second power supplying part 1012 through the second interface part 1043, the first interface part 1015, the first communicating part 1013, the communication line 1004, and the second communicating part 1022. Also, the controlling part 1042 sends and receives a signal to and from the third power supplying part 1031 through the second interface part 1043, the first interface part 1015, the first communicating part 1013, the communication line 1004, and the third communicating part 1032.

The controlling part 1042 conducts various condition settings and operation controls such as a start and stop of the power supply, a voltage setting of a power to supply, a current setting of the power to supply, a switch from a regular operation mode to a low power consumption operation mode, and a like, with respect to each of the first, second, and third power supplying parts 1011, 1021, and 1031. Also, the controlling part 1042 receives information for each of the loads A1 through Am, B1 through Bn, and C1 through Cp sent from the first power supplying part 1011, the second power supplying part 1021, and the third power supplying part 1031, for example, information such as a present current consumption value, an output voltage value, and a like, and sends a new instruction to the first power supplying part 1011, the second power supplying part 1021, and the third power supplying part 1031. As described above, the controlling part 1012 sends and receives information to and from the first power supplying part 1011, the second power supplying part 1021, and the third power supplying part. 1031, mutually.

As described above, the power supplying system 1001*a* in the second embodiment conducts the operation control to each of the power supplying parts 1011, 1021, and 1031 of the power supplying units 1002*a*, 1003, and 1005 by separately providing the controlling unit 1041, and also sends and receives a signal with respect to the function unit 1045 so as to conduct the operation control. Accordingly, by the configuration in that a controlling part for controlling the entire product or a controlling part for controlling another function other than a power source serves as a controlling part for controlling each power supplying part of each power supplying unit, it is possible to further minimize the configuration of the power supplying system 1001*a* and to further reduce the expense.

In the fourth embodiment, the first interface part 1015 and the second interface part 1043 are provided in the power supplying system 1001*a*. Alternatively, if conditions such as input/output voltage levels, current driving abilities, and a like of the controlling part 1042 corresponds to those of the first power supplying part 1011 and the first communicating part 1013, the first interface 1015 and the second interface part 1043 are not needed. Accordingly, the controlling part 1042 maybe directly connected to the first power supplying part 1011 and the first communicating part 1013.

As seen from the above-explanation, according to the power supplying system according to the third and fourth embodiments of the present invention, the first power supplying part directly controlled from the controlling part is combined with at least one second power supplying part controlled from the controlling part through the first communicating part and the second communicating part. Therefore, it is possible to realize a preferable power supply from a small size of the power supplying system to a large size of the power supplying system. Moreover, since the first communicating part and the second communicating part conduct a communication each other to send and receive a signal, the number of signal lines is not increased even in the large size power supplying system. It is possible to minimize the power supplying system and reduce the expense.

Moreover, the controlling unit is provided to conduct the operation control of the first power supplying part in the first power supplying unit is conducted, and also the operation control of the second power supplying part in the second power supplying unit. Accordingly, the controlling parts being used in the product can be partially used. Therefore, it is possible to further minimize the power supplying system and reduce the expense.

Fifth Embodiment

Figure 20:
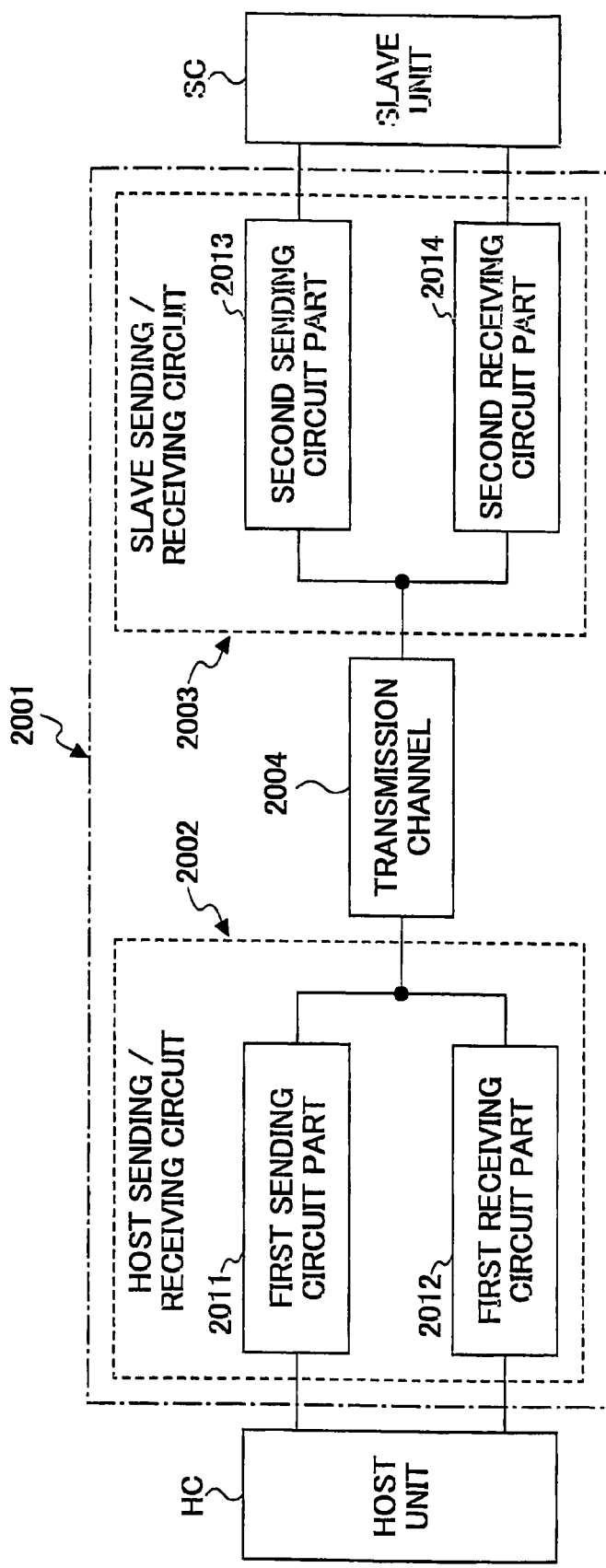
FIG. 20 is a schematic block diagram illustrating a serial communication apparatus according to a fifth embodiment of the present invention.

FIG. 20 is a schematic block diagram illustrating a serial communication apparatus according to a fifth embodiment of the present invention.

In FIG. 20, the serial communication apparatus 2001 conducts a serial communication by a half-duplex communication between the host unit HC and slave unit SC, and includes a host sending/receiving circuit 2002, and a slave sending/receiving circuit 2003. The host sending/receiving circuit 2002 is connected to the host unit HC and the slave sending/receiving circuit 2003 is connected to the slave unit SC. The host sending/receiving circuit 2002 and the slave sending/receiving circuit 2003 are connected each other by a transmission channel 2004 for a transmission of a serial signal. The host sending/receiving circuit 2002 corresponds to a first sending/receiving circuit in claims, and the slave sending/receiving circuit 2003 corresponds to a second sending/receiving circuit in claims.

The host sending/receiving circuit 2002 includes a first sending circuit part 2011 and a first receiving circuit part 2012. The slave sending/receiving circuit 2003 includes a second sending circuit part 2003 and a second receiving circuit part 2014. The first sending circuit part 2011 and the first receiving circuit part 2012 are connected to the second sending circuit part 2013 and the second receiving circuit part 2014 by the transmission channel 2004. In a case of sending data from the host sending/receiving circuit 2002 to the slave sending/receiving circuit 2003, a serial data signal is sent to the slave sending/receiving circuit 2003 from the first sending circuit part 2011 through the transmission channel 2004, and the second receiving circuit part 2014 extracts data from an signal input through the transmission channel 2004.

Moreover, when date are sent from the slave sending/receiving circuit 2003 to the host sending/receiving circuit 2002, a no-data signal is sent from the first sending circuit part 2011 to the slave sending/receiving circuit 2003 through the transmission channel 2004. The second sending circuit part 2013 is connected to the second receiving circuit part 2014. The second sending circuit part 2013 writes data by superimposing a pulse over the no-data signal input through the transmission channel 2004, and sends a serial data signal, in which the data are written, to the host sending/receiving circuit 2002 through the transmission channel 2004. The first receiving circuit part 2012 extracts the data from a signal input through the transmission channel 2004.

Figure 21:
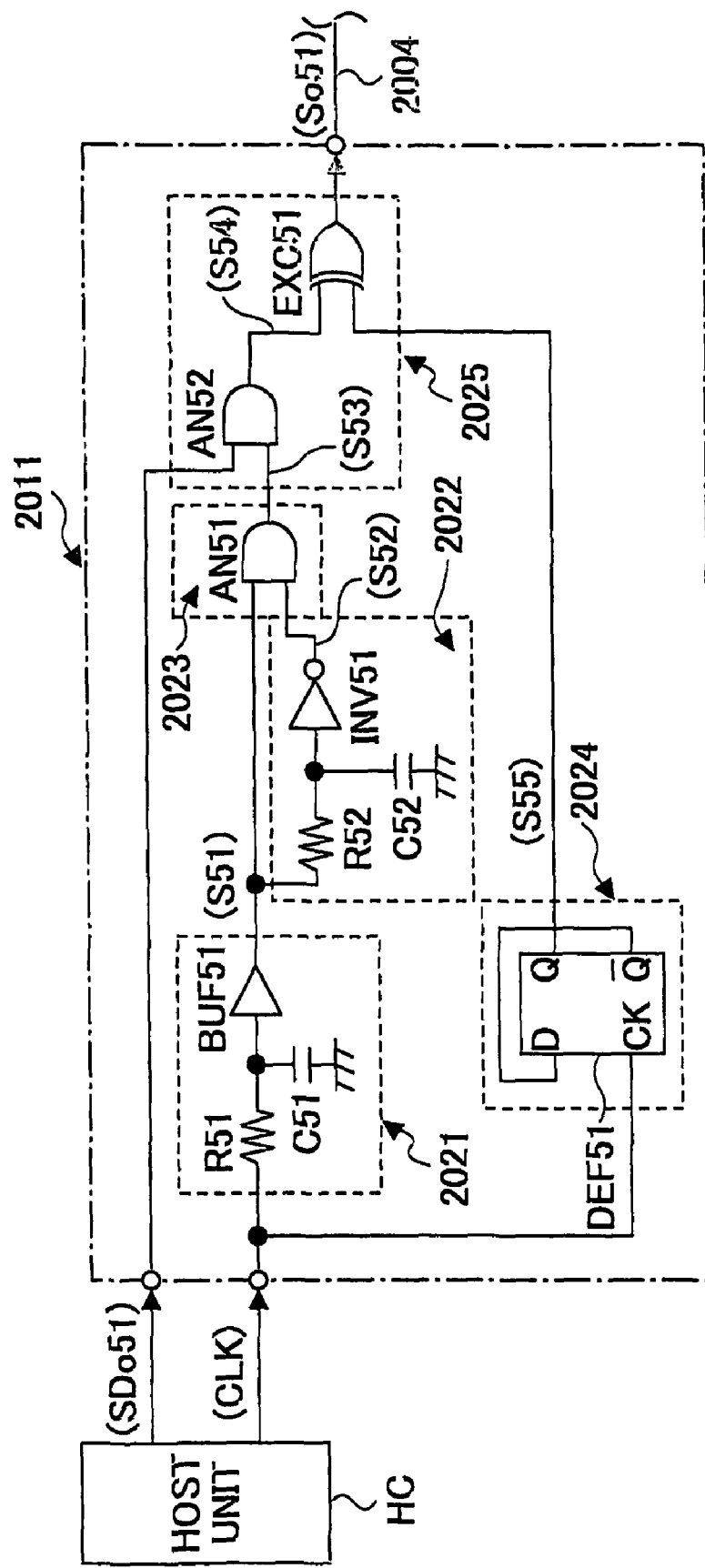
FIG. 21 is a diagram illustrating a circuit configuration of a first sending circuit part shown in FIG. 20, according to the fifth embodiment of the present invention.
Figure 22:
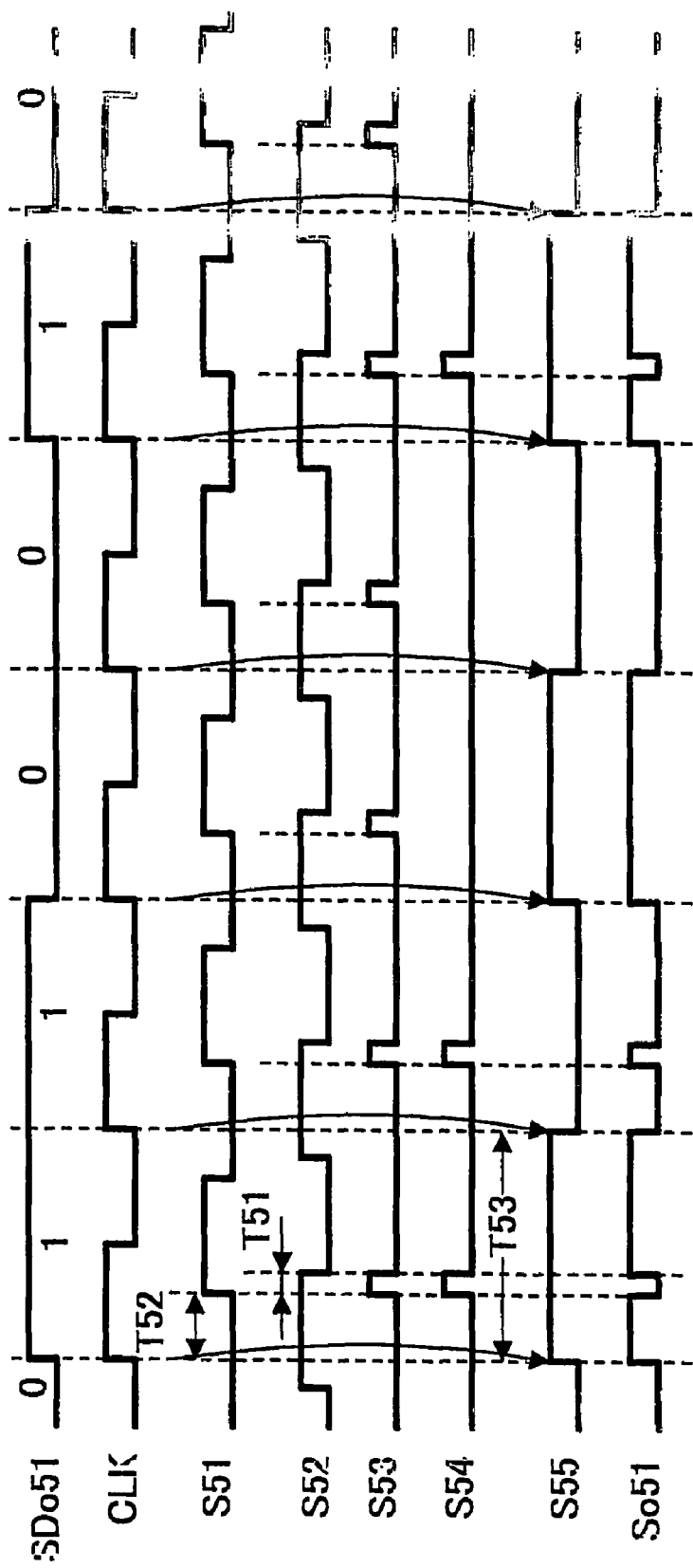
FIG. 22 is a timing chart diagram showing a waveform of a signal of each part shown in FIG. 21, according to the fifth embodiment of the present invention.

FIG. 21 is a diagram illustrating a circuit configuration of the first sending circuit part 2011 shown in FIG. 20 according to the fifth embodiment of the present invention. FIG. 22 is a timing chart diagram showing a waveform of a signal of each part shown in FIG. 21. The first sending circuit part 2011 will be described with reference to FIG. 21 and FIG. 22.

An output data signal SDo51 and a clock signal CLK are input to the first sending circuit part 2011 shown in FIG. 21 from the host unit HC. The first sending circuit part 2011 generates a serial output signal So51 corresponding to the output data signal SDo51 and outputs the serial output signal So51 to the transmission channel 2004. The clock signal CLK has a frequency two times as much as an output timing of the output data signal SDo51, and synchronizes the output data signal SDo51.

The first sending circuit part 2011 includes a T52 delaying circuit 2021 for delaying the clock signal CLK by a predetermined time T52, a T51 delaying circuit 2022 for further delaying an output signal S51 or the T52 delaying circuit 2021 by a predetermined time T51, a superimposing pulse generating circuit 2023 for generating a superimposing pulse signal S53 from the output signal S51 of the T52 delaying circuit 2021 and the output signal S52 of the T51 delaying circuit 2022, a T53 signal generating circuit 2024 for generating a pulse signal S55 of a predetermined pulse width T53 by dividing the clock signal CLK into two frequencies, and an output signal generating circuit 2025 for generating the serial output signal So51 from a superimposing pulse signal S54, in which the superimposing pulse signal S53 is superimposed by corresponding to the output data signal So51, and the pulse signal S55. The T51 delaying circuit 2022 corresponds to a first T51 delaying circuit in claims, the superimposing pulse generating circuit 2023 corresponds to a first superimposing pulse generating circuit in claims, and the output signal generating circuit 2025 corresponds to a first output signal generating circuit in claims.

The T52 delaying circuit 2021 includes a resistor R51, a capacitor C51, and a buffer gate BUF51. The capacitor C51 is connected between one end of the resistor R51 and the earth ground, and the clock signal CLK is input to another end of the resistor R51. Moreover, a connection portion of the resistor R51 and the capacitor C51 is connected to an input terminal of the buffer gate BUF51. The output signal S51 of the T52 delaying circuit 2021 becomes a signal in which the clock signal CLK is delayed by the time T52 as shown in FIG. 22. The time T52 to be delayed is determined by a threshold voltage Vt51 for the resistor R51, the capacitor C51, and the buffer gate BUF51.

Moreover, the T51 delaying circuit 2022 includes a resistor R52, a capacitor C52, and an inverter INV51. The resistor R52 and the capacitor C52 are connected in serial at an output terminal of the T52 delaying circuit 2021, that is, between an output terminal of the buffer gate BUF51 and an earth ground. In addition, a connection portion of the resistor R52 and the capacitor C52 is connected to an input terminal of the inverter INV51. The output signal S52 of the T51 delaying circuit 2022 inverts the output signal S51 of the T52 delaying circuit 2021 as shown in FIG. 22, and becomes a signal being delayed by the time T51. The time T51 to be delayed for the T5 delaying circuit 2022 is determined by a threshold Vt52 for the resistor R32, the capacitor C52, and the inverter INV51.

The superimposing pulse generating circuit 2023 includes an AND circuit AN51. The output signal S51 of the T52 delaying circuit 2021 and the output signal S52 of the T51 delaying circuit 2022 are input to input terminals of the AND circuit AN51, respectively. As shown by the superimposing pulse signal S53 in FIG. 22, from the output terminal of the AND circuit AN51, the superimposing pulse is created at intervals of one period of the clock signal CLK one by one.

The T53 signal generating circuit 2024 includes a ½ dividing circuit configured of a D flip flop DFF51. The clock signal CLK is input to a clock input terminal CK of the D flip flop DFF51. An output terminal Q s inverted when the clock signal CLK is raised from the low level to the high level, and as shown by the signal S55 in FIG. 22, the T53 signal generating circuit 2024 generates a signal having the pulse width T53 being inverted at intervals of the time T33, and outputs the signal.

The output signal generating 2025 Includes an AND circuit AN52 and ExOR (Exclusive OR) circuit EXC51. The output data signal SDo51 and the output signal S53 of the superimposing pulse generating circuit 2023 are input to two input terminals of the AND circuit AN52, respectively. An output terminal of the AND circuit AN52 is connected to one input terminal of the ExOR circuit EXC51. The output signal S55 of the T53 signal generating circuit 2024 is input to another input terminal of the ExOR circuit EXC51. The output signal generating circuit 2025 determines a presence or absence of a superimposing pulse of the output signal S53 in response to the output data signal SDo51 each time the signal level of the out put signal S55 is charged, and generates the serial output signal So51 as shown in FIG. 22.

Figure 23:
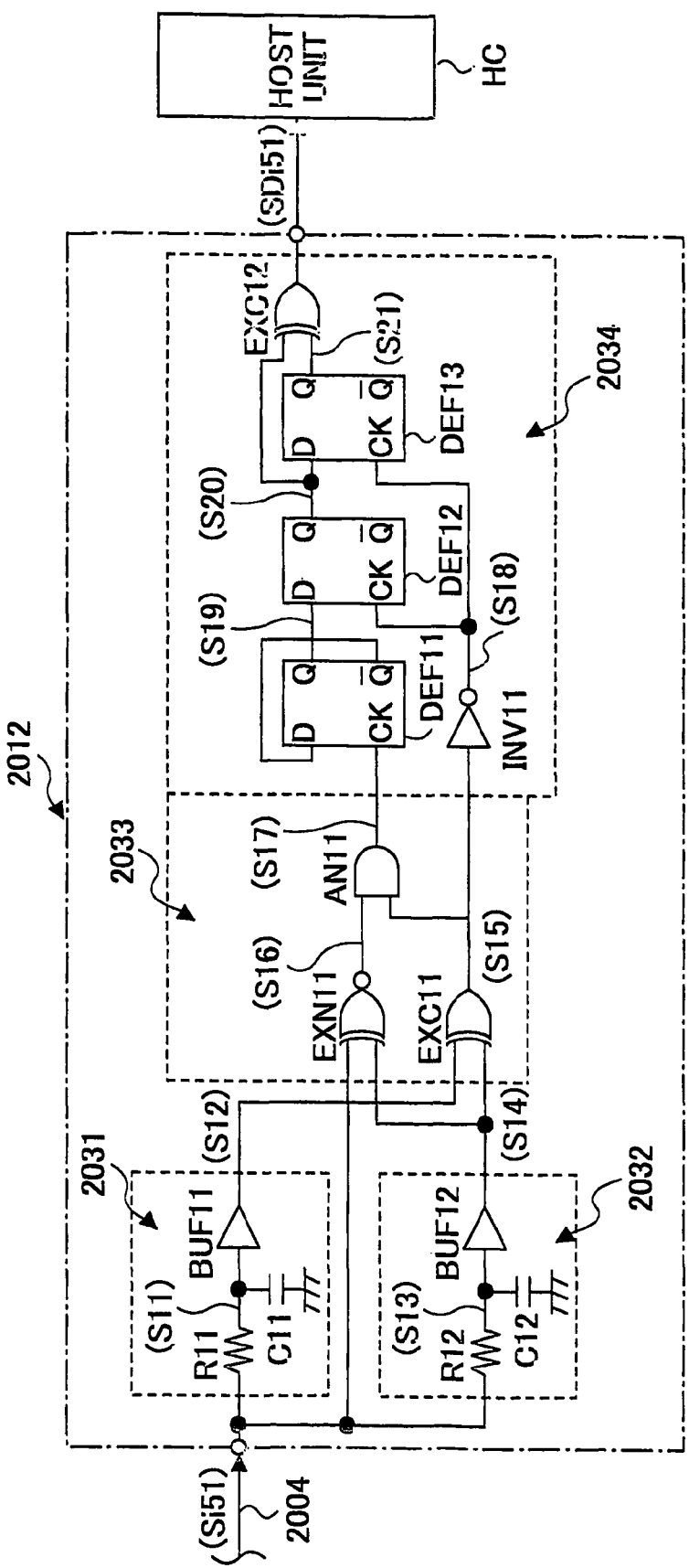
FIG. 23 is a diagram illustrating a circuit configuration of a first receiving circuit part in FIG. 20, according to the fifth embodiment of the present invention.
Figure 24:
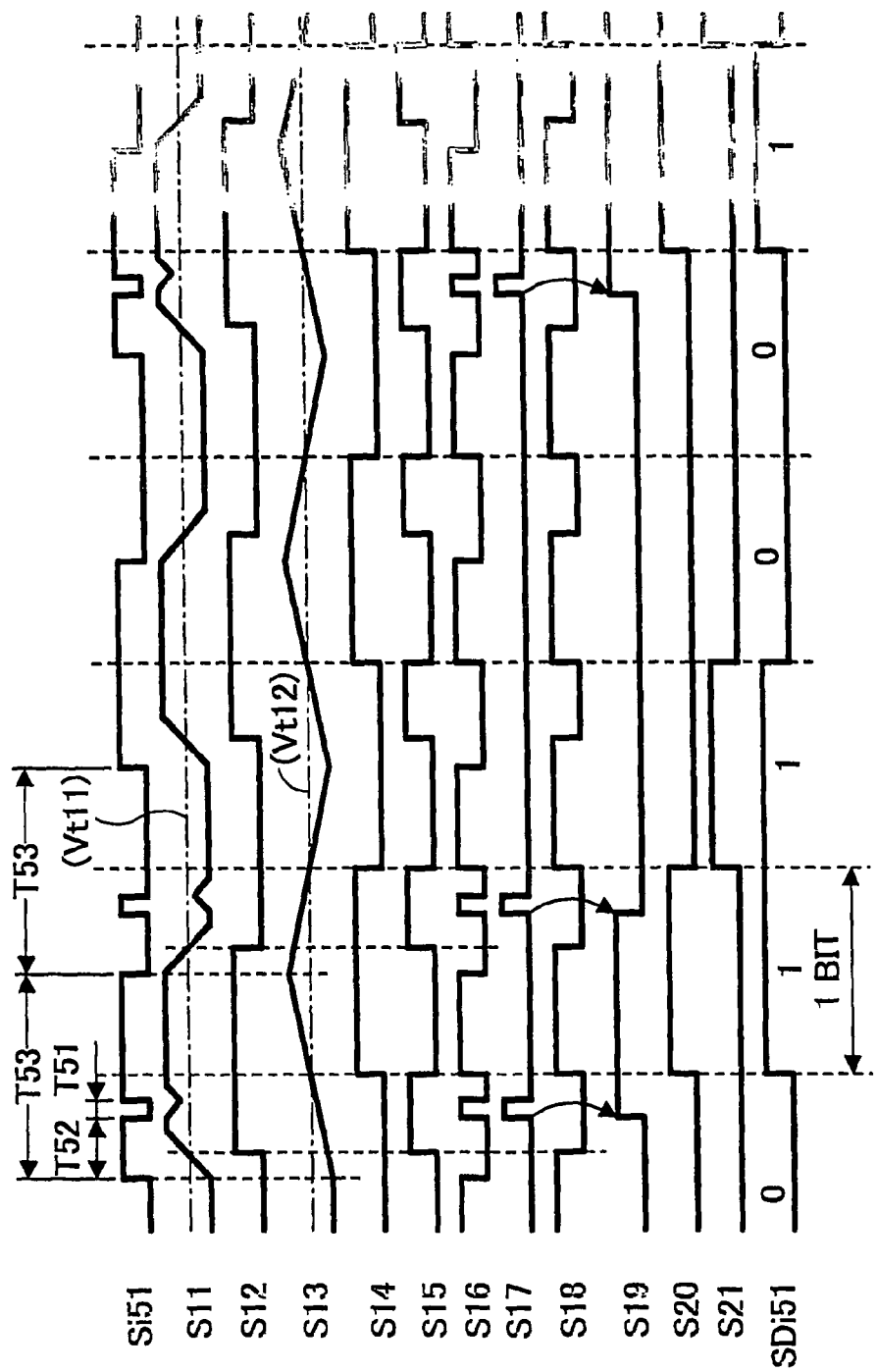
FIG. 24 is a timing chart diagram showing a waveform of each part in FIG. 23, according to the fifth embodiment of the present invention.

Next, FIG. 23 is a diagram illustrating a circuit configuration of the first receiving circuit part 2012 in FIG. 20. FIG. 24 is a timing chart diagram showing a waveform of each part in FIG. 23. The first receiving circuit part 2012 will be described with FIG. 23 and FIG. 24.

The first receiving circuit Dart 2012 in FIG. 24 extracts data from a serial input signal Si51 input from the transmission channel 2004 and outputs the data as an input data signal SDi51 to the host unit EC.

The first receiving circuit part 2012 includes a T51 eliminating circuit 2031 for eliminating a superimposing pulse from the serial input signal Si51 an input signal delaying circuit 2032 for delaying by more than a time of the serial input signal Si51 (T51+T52) while eliminating the superimposing pulse, a superimposing pulse extracting circuit 2033 for extracting the superimposing pulse from the serial input signal Si51, an output signal S12 of the T51 eliminating circuit 2031, an output signal S14 of the input signal delaying circuit 2032, and a data extracting circuit 2034 for extracting a data signal from an output signal S17 of the superimposing pulse extracting circuit 2033 and outputting the data signal as the input data signal SDi51 to the host unit HC. Moreover, the T51 eliminating circuit 2031 corresponds to a first T1 eliminating circuit in claims, the input signal delaying circuit 32 corresponds to an input signal delaying circuit in claims, the superimposing pulse extracting circuit 2033 corresponds to a first superimposing pulse extracting circuit in claims, and the data extracting circuit 2034 corresponds to a first data extracting circuit in claims.

The T51 eliminating circuit 2031 includes a resistor R11, a capacitor C11, and a buffer gate BUF11. The capacitor C11 is connected between one end of the resistor R11 and the earth ground, and the serial input signal Si51 is input to another end of the resistor R11. Moreover, a connection portion of the resistor R11 and the capacitor C11 is connected to an input terminal of the buffer gate BUF11. A signal at a connection portion of the resistor R11 and the capacitor C11 is a signal S11.

As seen from FIG. 24, by the T51 eliminating circuit 2031, the superimposing pulse of the serial input signal Si51 is eliminated, and are original signal of the pulse width T53 is taken out and output as the output signal S12. The shorter the pulse width T51 of the superimposing pulse, the smaller a time constant of the T51 eliminating circuit 2031 becomes. Accordingly, it is possible to easily eliminate the superimposing pulse. Moreover, since a phase difference between the output signal S12 of the T51 eliminating circuit 2031 and the serial input signal Si51 becomes smaller, it is preferable when the pulse width T51 of the imposed pulse is shorter.

The input signal delaying circuit 2032 includes a resistor R12, a capacitor C12, and a buffer gate BUF12. The capacitor C12 is connected to one end of the resistor R12 and an earth ground, and the serial input signal Si51 is input to the resistor R12. Moreover, a connection portion of the resistor R12 and the capacitor C12 is connected to an input terminal of the buffer gate BUF12. A signal data connection portion of the resistor R12 and the capacitor C12 is a signal S13.

As seen from FIG. 24, since a time constant of the input signal delaying circuit 2032 is set to be greater then the time constant, the output signal S14 of the input signal delaying circuit 2032 is a signal in that the superimposing pulse is eliminated from the serial input signal Si51 and the serial input signal Si51 is delayed by more than a time (T51+T52). In FIG. 24, a voltage Vt11 shows a threshold voltage of the buffer gate BUF11 and the voltage Vt12 is a threshold voltage of the buffer gate BUF12.

The superimposing pulse extracting circuit 2033 includes an ExNOR (Exclusive NOR) circuit EXN11, an ExOR circuit EXC11, and an AND circuit AN11. The serial input signal Si51 and the output signal S14 of the input signal delaying circuit 2032 are corresponded and input to two input terminals of the ExNOR circuit EXN11. The output terminal of the T51 eliminating circuit 2031 and the output terminal of the input signal delaying circuit 2032 are corresponded and connected to two input terminals of the ExOR circuit EXC11.

The output terminal of the ExNOR circuit EXN11 and the output terminal of the ExOR circuit EXC11 are corresponded and connected to two input terminals of the AND circuit AN11. An output signal S15 is the output signal of the ExOR circuit EXC11, an output signal S16 is the output signal of the ExNOR circuit EXN11, and an output signal S17 is the output signal of the AND circuit AN11. As seen from FIG. 24, an extracted superimposing pulse is output as the output signal S17 from the AND circuit AN11.

The data extracting circuit 2034 includes three D flip flop DFF11 through DFF13, an inverter INV11, and an ExOR circuit EXC12. The output signal S17 of the super imposing pulse extracting circuit 2033 is input to a clock signal input terminal CK of the D flit flop DFF11. An inverting output terminal QB of the D flip flop DFF11 is connected to a data input terminal D of the D flip flop DFF11. In addition, an output terminal Q of the D flip flop DFF11 is connected to a data input terminal D of the D flip flop DFF12.

Furthermore, the output terminal Q of the D flip flop DFF12 is connected to a data input terminal D of the D flip flop DFF13. An output terminal of the ExOR circuit EXC11 is connected to the D flip flop DFF12 and the clock signal input terminal CK of the D flip flop DFF13. The output terminals Q of the D flip flop DFF12 and the D flip flop DFF13 are corresponded and connected to two input terminals of the ExOR circuit EXC12.

A output signal S18 is the output signal of the inverter INV11 and output signals S19 through S21 are the output signals from the output terminals Q of the D flip flop DFF11 through DFF13.

In FIG. 24, the ExOR circuit EXC12 outputs a signal having the low level when the signal levels of the output signal S20 and the output signal S21 are corresponded to each other, and the ExOR circuit EXC12 outputs a signal having the high level when the signal levels of the output signal S20 and the output signal S21 are not corresponded to each other. Accordingly, the input data signal SDi51 becomes the high level while the superimposing pulse is superimposed over the serial input signal Si51.

Figure 25:
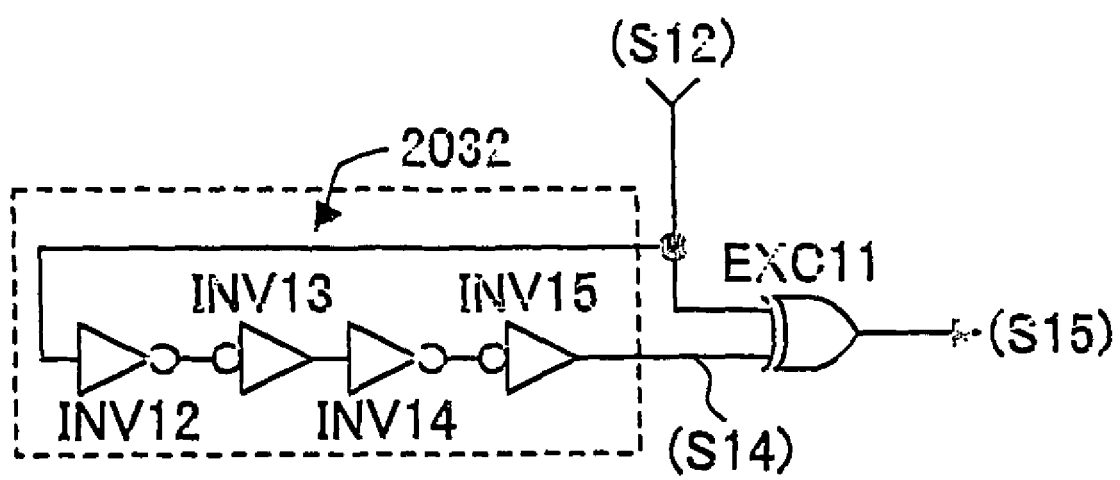
FIG. 25 is a diagram illustrating another circuit configuration of an input signal delaying circuit shown in FIG. 23, according to the fifth embodiment of the present invention.

FIG. 25 is a diagram illustrating another circuit configuration of the input signal delaying circuit 2032 shown in FIG. 24. Since the superimposing pulse is eliminated by the T51 eliminating circuit 2031, it is possible to generate a signal S14 shown in FIG. 24 by delaying the output signal S12 of the T51 eliminating circuit 2031. In FIG. 25, a circuit example utilizing a signal delay until an input change of Inverters appears is illustrated. Four Inverters INV12 through INV 15 are connected in series. It is possible to obtain a necessary delay time by increasing the number of inverters. In FIG. 25, in the input signal delaying circuit 2032, the number of inverters, which are connected in series so as not to invert the signal level of the output signal With respect to the input signal, is even number. Moreover, the input signal delaying circuit 2032 is not limited to the circuit shown in FIG. 25 but can be a monostable multivibrator using a CR or a delaying circuit such a shift transistor or a like.

Figure 26:
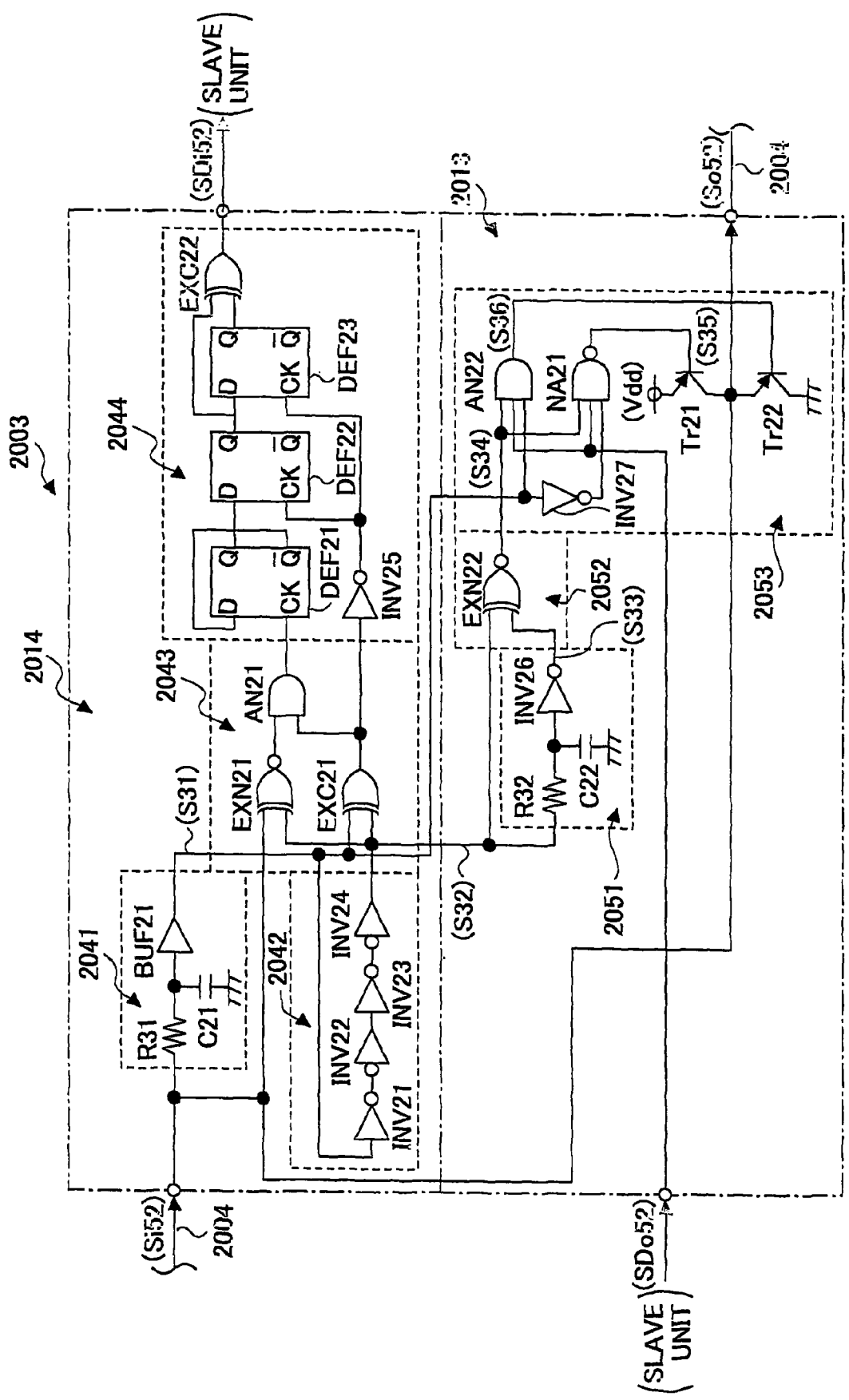
FIG. 26 is a diagram illustrating a circuit configuration of a slave sending/receiving circuit shown in FIG. 23, according to the fifth embodiment of the present invention.
Figure 27:
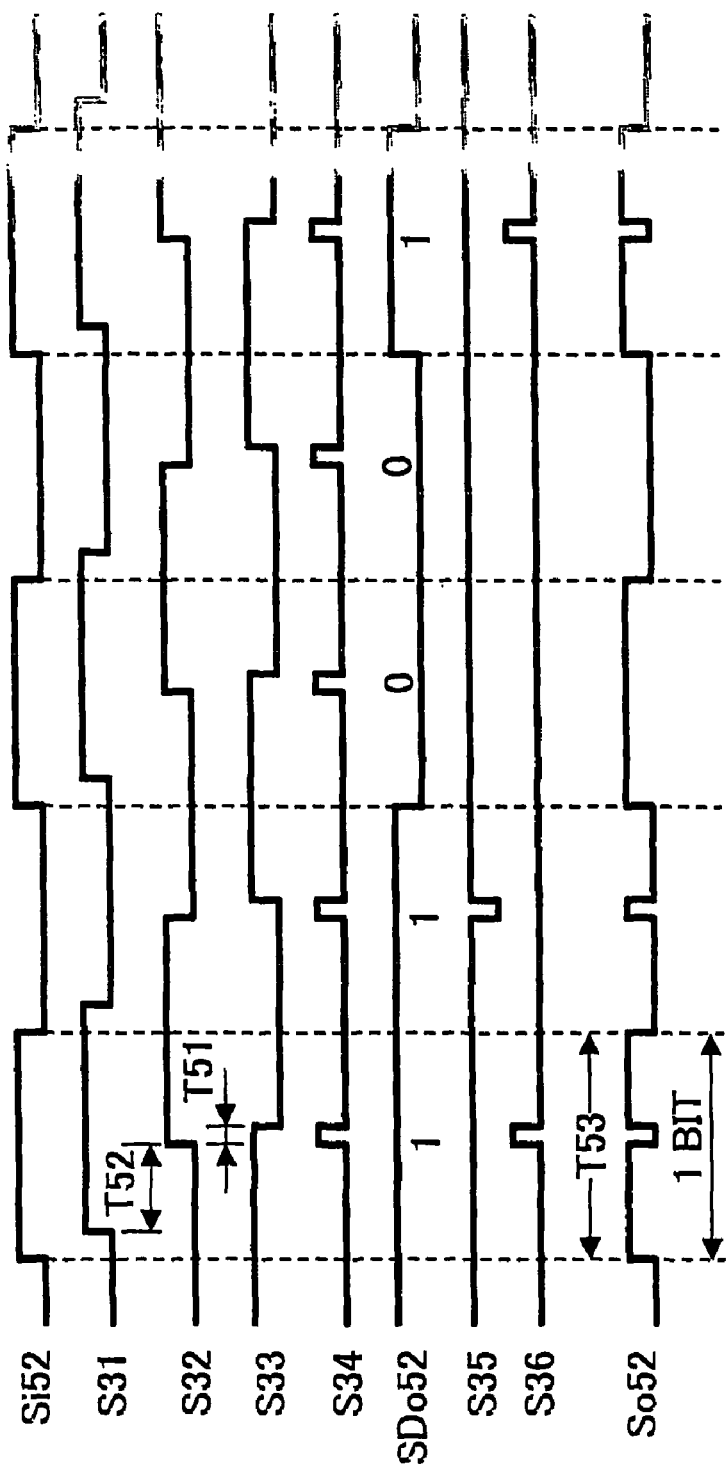
FIG. 27 is a timing chart showing a waveform of each part shown in FIG. 26, according to the fifth embodiment of the present invention.

FIG. 26 is a diagram illustrating a circuit configuration of the slave sending/receiving circuit shown in FIG. 20. FIG. 27 is a timing chart showing a waveform of each part shown in FIG. 26. The slave sending/receiving circuit 2003 will be described with reference to FIG. 26 and FIG. 27.

In FIG. 26, the second receiving circuit part 2014 extracts data from the serial input signal Si52 input from the transmission channel and outputs as the input data signal SDi52 to the slave unit SC.

The second receiving circuit part 2014 includes a T51 eliminating circuit 2041 for eliminating the superimposing pulse from the serial input signal Si52, a input signal delaying circuit 2042 for outputting an output signal S31 of the T51 eliminating circuit 2041 by delaying by more than a time (T51+T52), a superimposing pulse extracting circuit 2043 for extracting the superimposing pulse from the serial input signal Si52, the output signal S31 of the T51 eliminating circuit 2041, and the output signal S32 of the input signal delaying circuit 2042, and a data extracting circuit 2044 for extracting a data signal from the output signal of the superimposing pulse extracting circuit 2042 and outputting the data signal as the input data signal SDi52.

The second receiving circuit part 2014 has a circuit configuration similar to the first receiving circuit part 2012 shown in FIG. 23, and the explanation thereof will be omitted. The T51 eliminating circuit 2041 corresponds to a second T1 eliminating circuit in claims, the input signal delaying circuit 2042 corresponds to an input signal delaying circuit in claims, the superimposing pulse extracting circuit 2043 corresponds to a second superimposing pulse extracting circuit in claims; and the data extracting circuit 2044 corresponds to a second data extracting circuit in claims.

Next, the second sending circuit part 2013 includes a T51 delaying circuit 2051 for delaying the output signal S32 of the input signal delaying circuit 2042 by a time T51, a superimposing pulse generating circuit 2052 for generating and outputting a superimposing pulse signal S34 from the output signal S32 of the input signal delaying circuit 2042 and the output signal S33 of the T51 delaying circuit 2051, and an output signal generating circuit 2053 for generating a serial output signal So52 and outputting the serial output signal So52 to the transmission channel 2004. The T51 delaying circuit 2051 corresponds to a second T51 delaying circuit in claims, the superimposing pulse generating circuit 2052 corresponds to a second superimposing pulse generating circuit in claims, and the output signal generating circuit 2053 corresponds to a second output signal generating circuit in claims.

The T51 delaying circuit 2051 includes a resistor R32, a capacitor C22, and an inverter INV26. The capacitor C22 is connected to between one and of the resistor R32 and an earth ground, and an output signal S32 of the input signal delaying circuit 2042 is input to another end of the resistor R32. Moreover, a connection part of the resistor R32 and the capacitor C22 is connected to an input terminal of the inverter INT26. As seen from FIG. 27, the T51 delaying circuit 2051 delays the output signal S32 of the input signal delaying circuit 2042 by the delay time T51 and also inverts the signal level to output the output signal S32 as the output signal S33.

The superimposing pulse generating circuit 2052 includes an ExNOR circuit EXN22. An input terminal and an output terminal of the T51 delaying circuit 2051 correspond and are connected to two input terminals of the ExNOR circuit EXN22. From an output terminal of the ExNOR circuit EXN22, the output signal S34, which is formed by generating the superimposing signal one by one at intervals of half period of the serial input signal Si52, is output.

The output signal generating circuit 2053 includes an AND circuit AN22 having three input terminals, a NAND circuit NA21 having three input terminals, a PNP transistor Tr21, and an NPN transistor Tr22. In the AND circuit AN22 and the NAND circuit NA21, the output signal S34 of the superimposing pulse generating circuit 2052 is input to each of first input terminals and the output data signal SDo52 is input to each of second input terminals. Furthermore, the output signal S31 of the T51 eliminating circuit 2041 in the second receiving circuit part 2014 is input to a third input terminal of the AND circuit AN22, and a signal, in which the signal level of the output signal S31 of the T51 eliminating circuit 2041 is inverted, is input to a third input terminal of the NAND circuit NA21.

An output terminal of the AND circuit AN22 is connected to a base of the NPN transistor Tr22, and an output terminal of the NAND circuit NA21 is connected to a base of the PNP Transistor Tr22. The PNP transistor Tr21 and the NPN transistor Tr22 are connected in series between the power voltage Vdd and an earth ground, and the serial output signal So52 is output from a connection portion of the PNP transistor Tr21 and the NPN transistor Tr22 to the transmission channel 2004. The AND circuit AN22 outputs a signal having the high level when both the serial input signal Si52 and the output data signal SDo52 have the high level, and the NPN transistor Tr22 turns ON to lower the signal level of the serial output signal So52.

The NAND circuit NA21 outputs a signal having the low level when the serial input signal Si52 is the low level and the output data signal SDi52 is the high level, and the PNP transistor Tr21 turns ON to raise the signal level of the serial input signal Si52. As described above, the second sending circuit part 2013 generates the serial output signal So52 by superimposing the superimposing pulse over the serial input signal So52. In the serial output signal So52 output from the second sending circuit part 2013 in FIG. 26, a location where the superimposing pulse is superimposed is Later than approximate time (T52+T51) from a start point. Since the time T51 is sufficiently smaller than the time T52, T52≈T51+T52 can be expressed. Accordingly, the serial output signal So52 can be sufficiently received by the first receiving circuit party 2012 described above.

The times T51 through T53 well be described above.

Figure 28A:
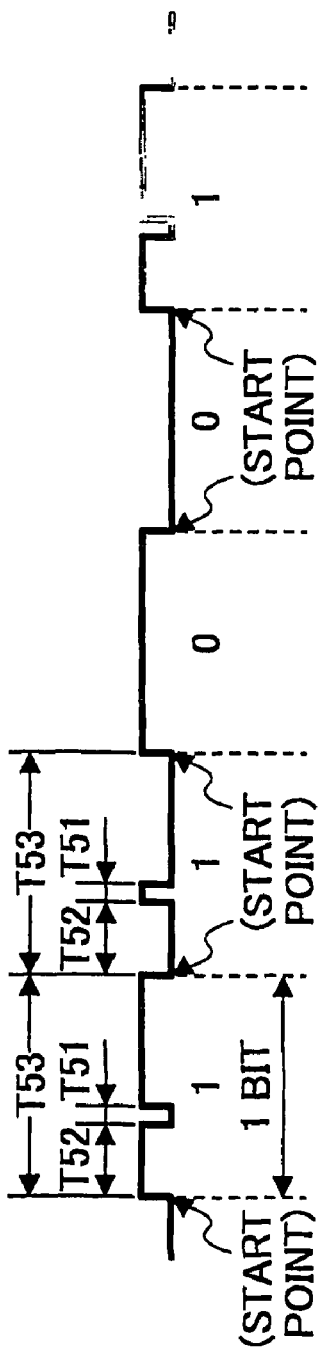
FIG. 28A through FIG. 28C are diagrams illustrating the serial output signal output from the transmission channel, according to the fifth embodiment of the present invention.
Figure 28B:
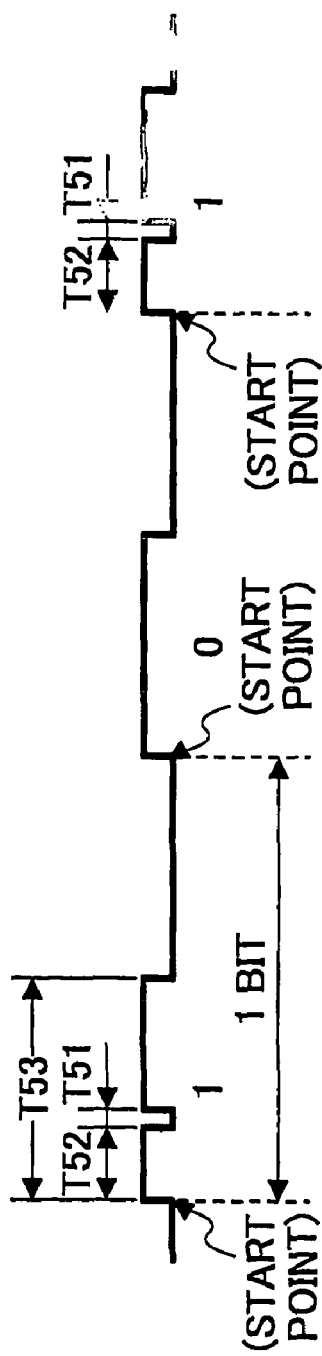
Figure 28C:
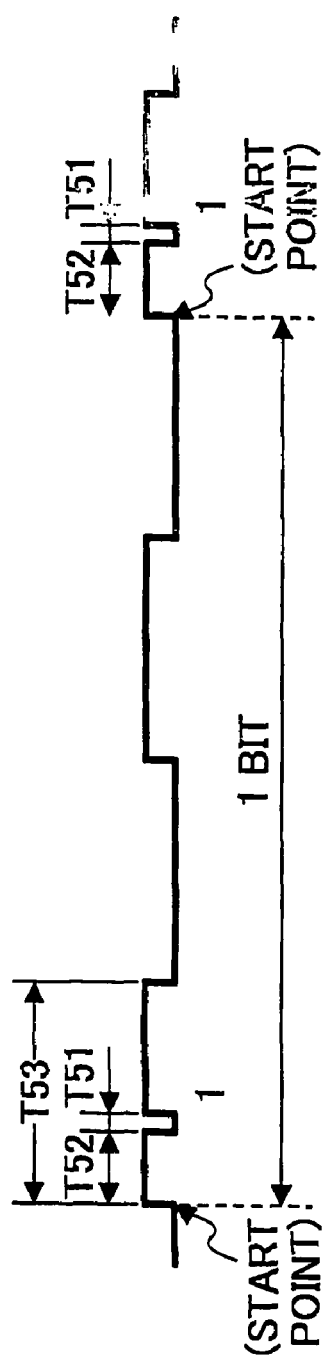

FIG. 28A through FIG. 28C are diagrams illustrating the serial output signal output from the transmission channel.

In the serial output signal shown in FIG. 28A, both a time point of changing from the low level to the high level and a time point of changing from the high level to the low level in a repeating signal repeating a pulse width having the time T53 are a start point.

When the output data signal is "1", at a time point when the time T52 passes from the start point, a pulse, which has a pulse width having the time T51 and in which the signal level is inverted, is generated. When the output data signal is "0", the pulse having the time T51 is not generated. In addition, the time T53 shows a term from the start point to the high level or the low level.

Relationships among the times T51 through T53 satisfy the following condition 1:

$$T51 < T52 < T53 \text{ and } (T51+T52) < T53 \quad \text{(condition 1)}.$$

The smaller the time T51 as much as possible, the easier a sending/receiving circuit can be configured. Preferably, the times T51 through T53 satisfy the following condition 2:

T51<<T52<T53　　　　(condition 2).

Moreover, if the time 53 is two times shorter than the time T52, the sending/receiving circuit can be easily configured. Preferably, the following condition 3 is satisfied:

(T51+T52)<T53/2　　　　(condition 3),

FIG. 28B illustrates a serial output signal in that a time point of changing from the low level to the high level in the repeating signal is set as the start point. In this case, a pulse width having T53 is a term of the high level of the repeating signal. On the other hand, if the start point is a time point of changing from the high level to the low level, the pulse width having the time T53 becomes a term of the low level of the repeating signal.

FIG. 28C illustrates a serial output signal in that a time point of changing from the low level to the high level every two periods of the repeating signal is set as the start point.

Various settings of the start point can be considered other than the start points shown in FIG. 28A, FIG. 28B, and FIG. 28C. Preferably, the start point may be set so as to satisfy the above conditions 1 through 3 based on a transmission system being used.

Figure 29:
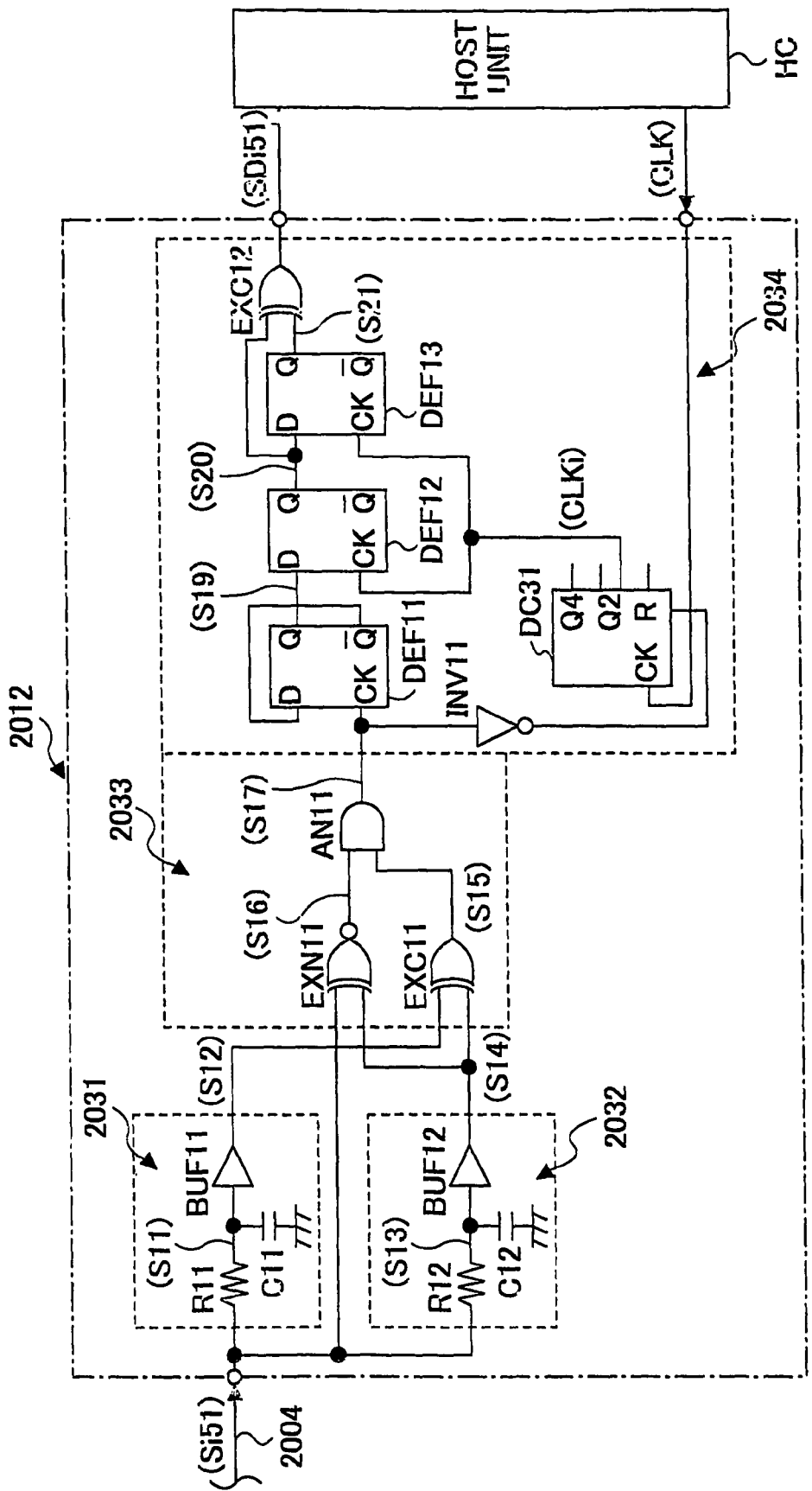
FIG. 29 is a diagram illustrating another circuit configuration of the first receiving circuit according to the fifth embodiment of the present invention.
Figure 30:
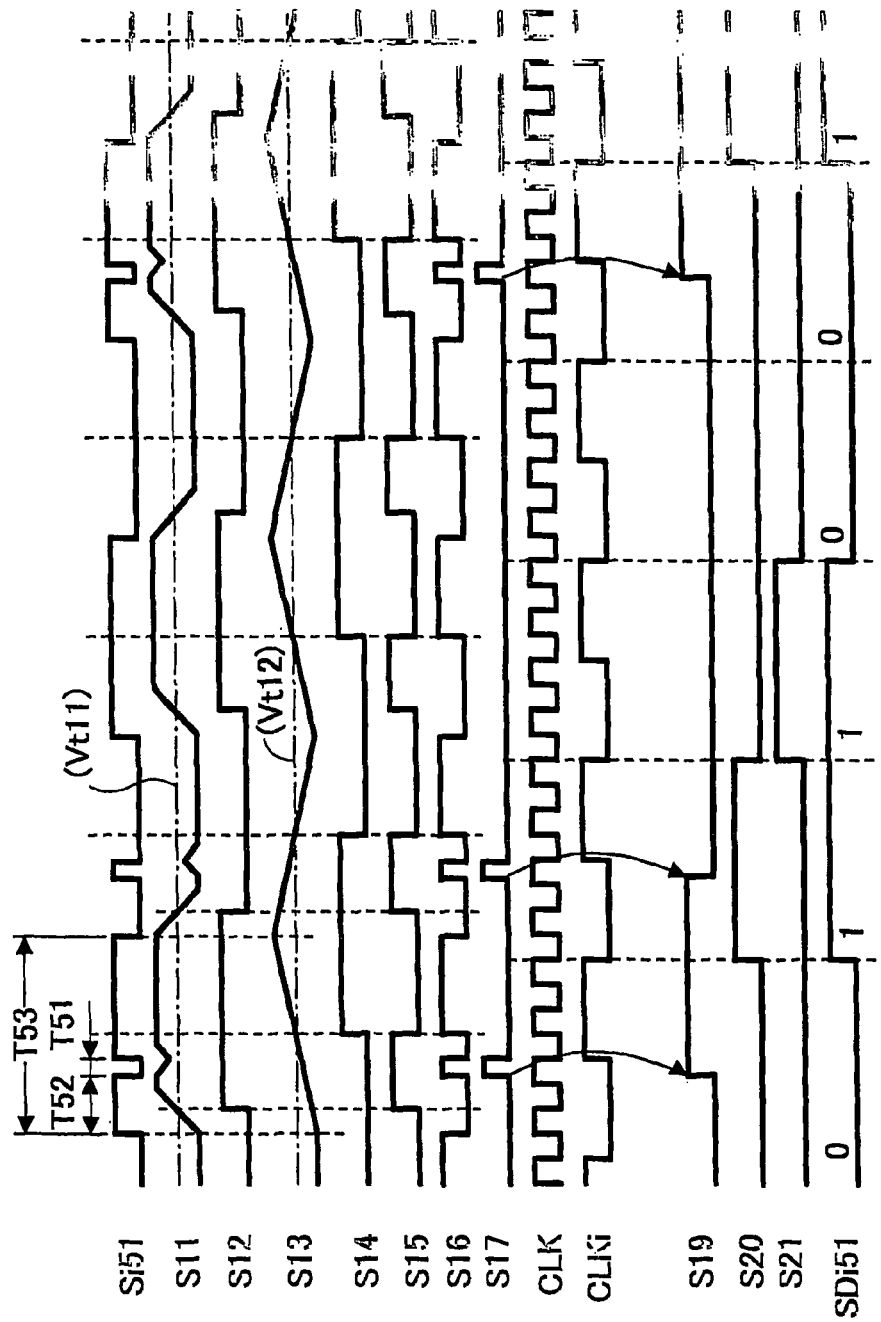
FIG. 30 is a timing chart diagram showing a waveform of a signal of each part shown in FIG. 29, according to the fifth embodiment of the present invention.

FIG. 29 is a diagram illustrating another circuit configuration of the first receiving circuit. FIG. 30 is a timing chart diagram showing a waveform of a signal of each part shown in FIG. 29. In FIG. 29, parts that are the same as those shown in FIG. 23 are given the same reference numbers, and an explanation thereof will be omitted. Different points from the circuit configuration of the first receiving circuit 2012 in FIG. 23 will be described.

Differently from the circuit configuration shown in FIG. 23, in FIG. 29, a circuit configuration of the data extracting circuit 2034 in FIG. 23 is changed.

The data extracting circuit 2034 in FIG. 29 includes a D flip flop DFF11 through DFF13, and a down counter DC31 configured by an inverter INV11 and a PLL (Phase-Locked Loop). Connections to the D flip flop DFF11 are similar to the connections in FIG. 23, and connections to the D flip flops DFF12, DFF13, and the ExOR circuit EXC12 are similar to the connections other than each clock signal input terminal CK of the D flip flops DFF12 and DFF13.

An internal clock signal CLKi, in which the clock signal CLK is divided into four, is supplied from an output terminal Q2 of the down counter DC31 being an output of the PLL to each clock signal input terminal CK of the D flip Flops DFF12 and DFF13. Accordingly, as shown in FIG. 30, an output signal S20 of the D flip flop DFF12 and an output signal S21 of the D flip flop DFF13 synchronize when the internal clock signal CLKi rises and become a signal in that the output signal of the D flip flop DFF11 is shifted.

The output signal S17 of the superimposing pulse extracting circuit 2033 is input to a reset input terminal R of the down counter DC31, and the clock signal CLK is locked so as to generate four clocks during the pulse width having the time T53. Accordingly, the internal clock signal CLKi output from the output terminal Q of the down counter DC31 being the output of the PLL becomes a signal having two times frequency as much as a basic frequency of the serial input signal Si51. As seen from FIG. 30, the ExOR circuit EXC12 outputs a signal being the low level when the signal levels of the output signals S20 and S21 are corresponded to each other, and outputs a signal being the high level when the signal levels of the output signals S20 and S21 are not corresponded to each other. As seen from the input data signal SDi51 shown in FIG. 30, the input data signal SDi51, which becomes the high level in a term in which the serial input signal Si51 is superimposed over the serial input signal Si51, can be obtained.

As described above, according to the fifth embodiment of the present invention, in the serial communication apparatus, "1" and "0" of data are represented by a presence and absence of the superimposing pulse having a shorter pulse width than the time T52 in the pulse width having the time T53 which starts from a predetermined start point, at a time point in which the time T52 shorter than the time T53 passes from the start point. Accordingly, a synchronization signal is not required, and it is possible to realize sending/receiving circuits at an host side and a slave side by a simple circuit configuration. And it is possible to reduce a circuit size at the slave side, and a switching part for switching to send or receive is not required. It is possible to minimize the serial communication apparatus and reduce the expense. Moreover, it is not required for the slave sending/receiving circuit at the slave side to generate a clock signal. Therefore, it is possible to further simplify the circuit configuration.

Sixth Embodiment

Figure 31:
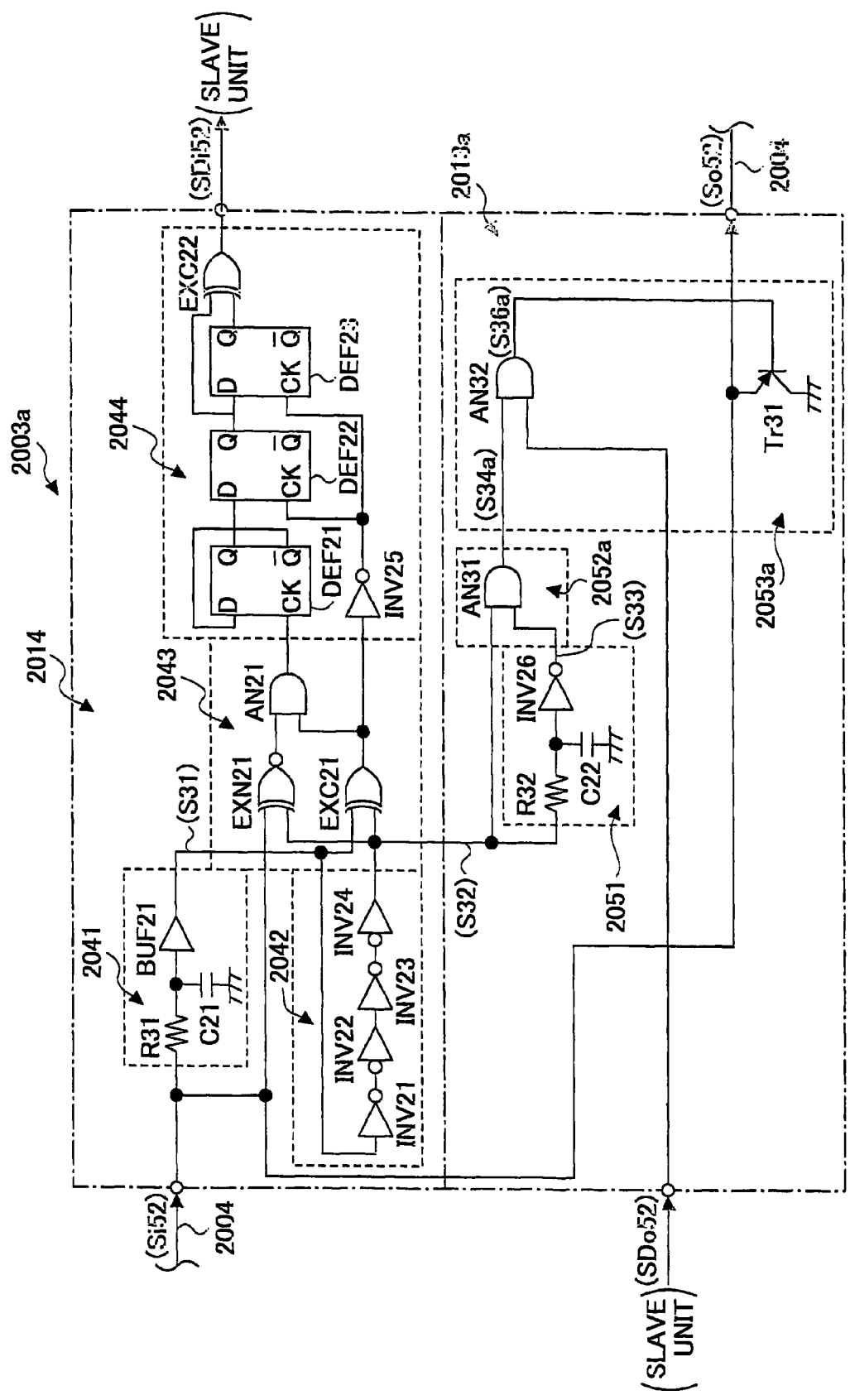
FIG. 31 is a diagram illustrating a circuit configuration of a slave sending/receiving circuit of a serial communication apparatus according to a sixth embodiment of the present invention.
Figure 32:
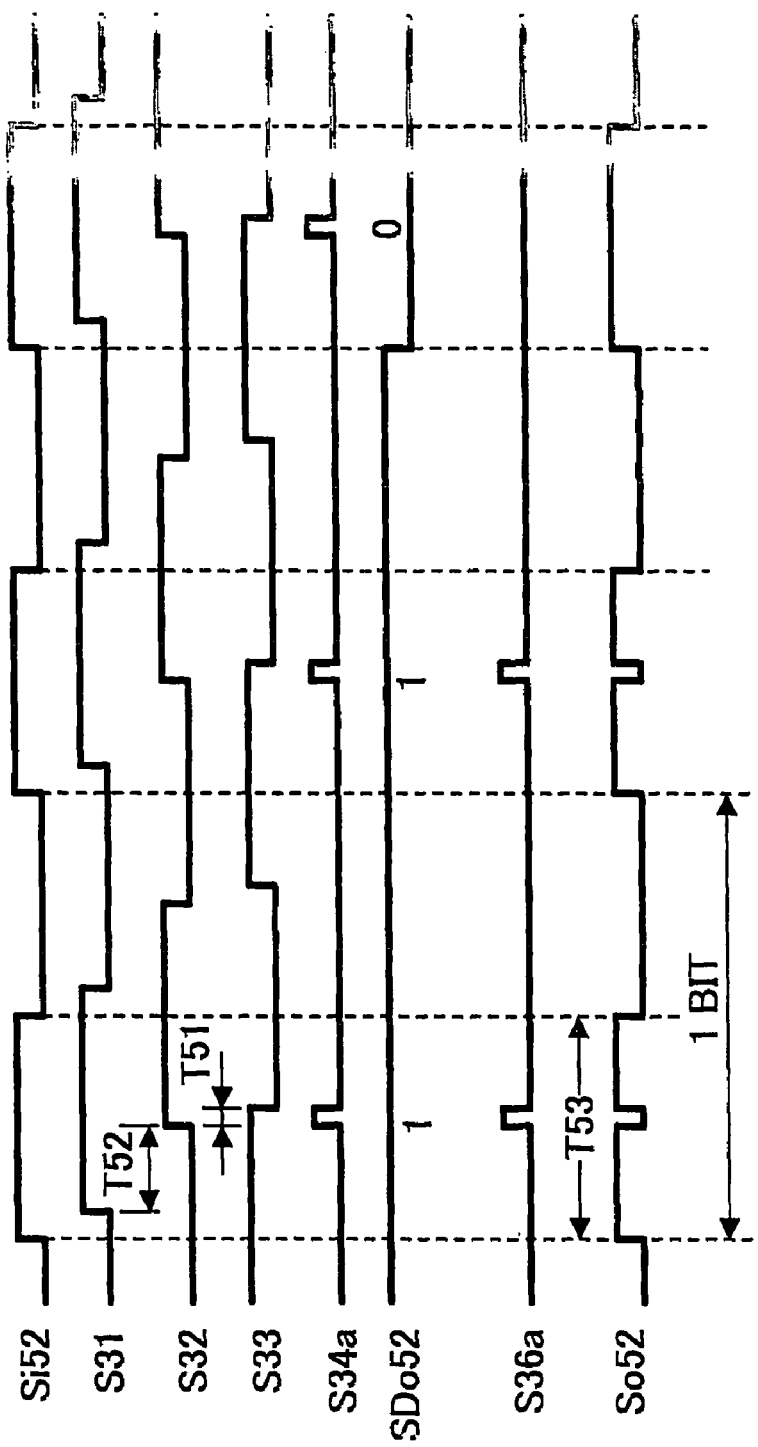
FIG. 32 is a timing chart diagram showing a waveform of a signal of each part shown in FIG. 31, according to the sixth embodiment of the present invention.

FIG. 31 is a diagram illustrating a circuit configuration of the slave sending/receiving circuit of the serial communication apparatus according to a sixth embodiment of the present invention. FIG. 32 is a timing chart diagram showing a waveform of a signal of each part shown in FIG. 31. In FIG. 32, reference numbers are changed regarding the slave sending/receiving circuit 2003 and the second sending circuit part 2013 in FIG. 20. In FIG. 32, parts other than the slave sending/receiving circuit 2003 and the second sending circuit part 2013 in FIG. 20 are the same as those shown in FIG. 26 and are given the same reference numbers, and an explanation thereof will be omitted. Different points from the circuit configuration in FIG. 26 will be described.

Differently from the configuration in FIG. 26, in FIG. 31, the circuit configuration of the superimposing pulse generating circuit 2052 in FIG. 26 is changed to be a superimposing pulse generating circuit 2052a, and the circuit configuration of the output signal generating circuit 2053 is changed to be an output signal generating circuit 2053a. Thus, the second sending circuit part 2013 in FIG. 26 is shown as a second sending circuit part 2013a, and the slave sending/receiving circuit 2003 is shown as a slave sending/receiving circuit 2003a.

Figure 1:
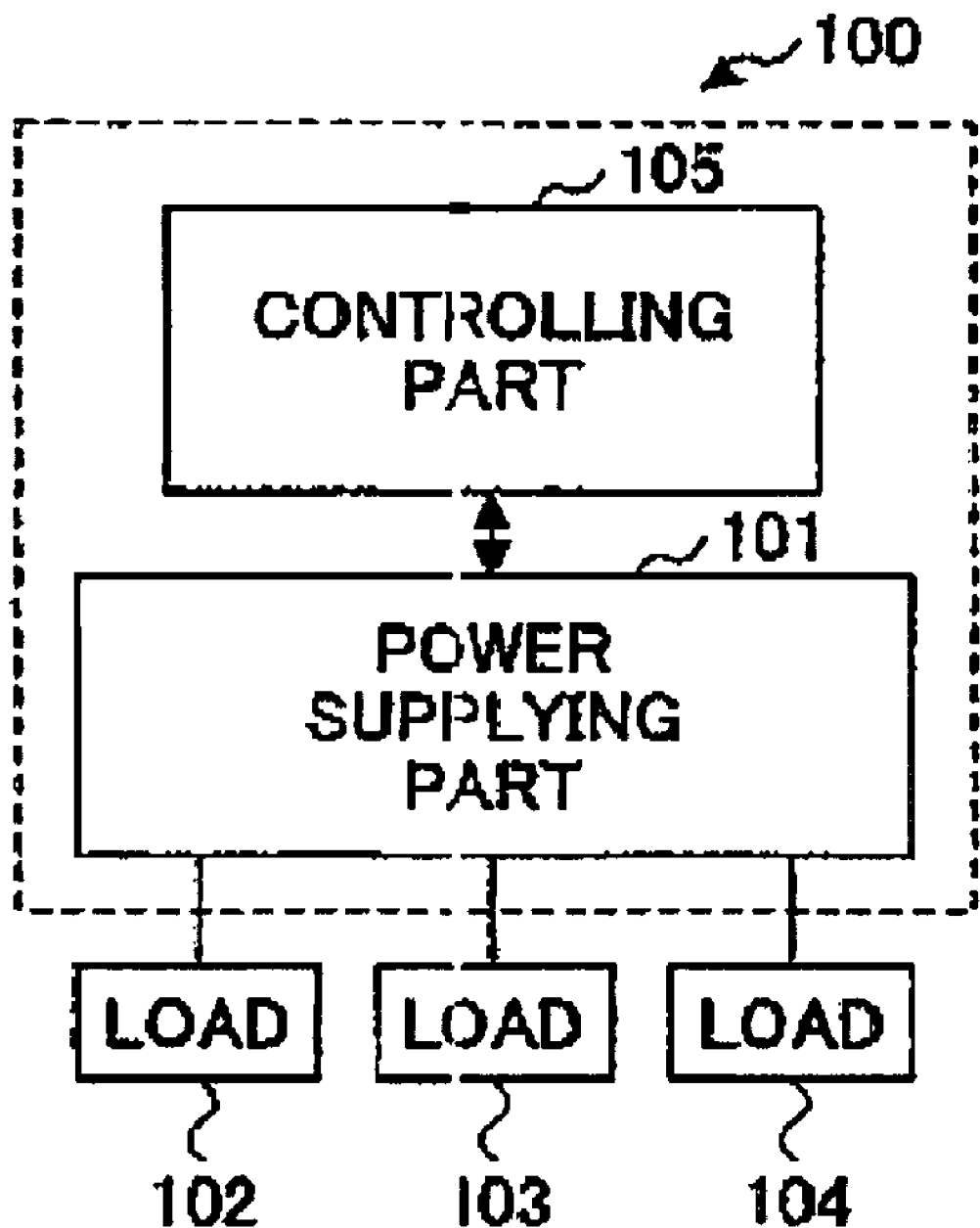
FIG. 1 is a block diagram illustrating a conventional power supply apparatus.
Figure 2:
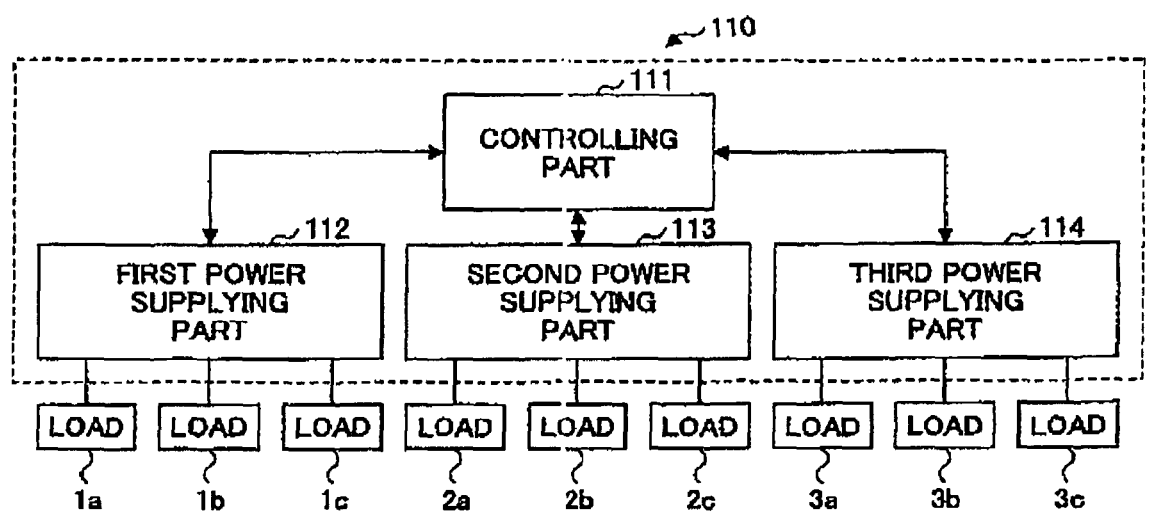
FIG. 2 is a block diagram illustrating another conventional power supplying apparatus having a configuration in chat a controlling part controls a plurality of power supplying parts.
Figure 3:
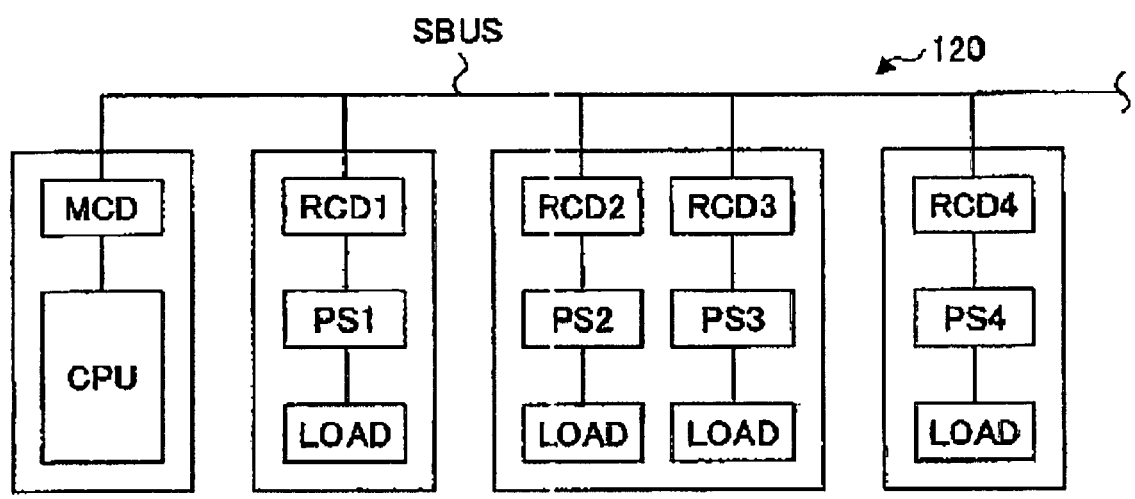
FIG. 3 is a block diagram illustrating a conventional power supplying system.
Figure 4:
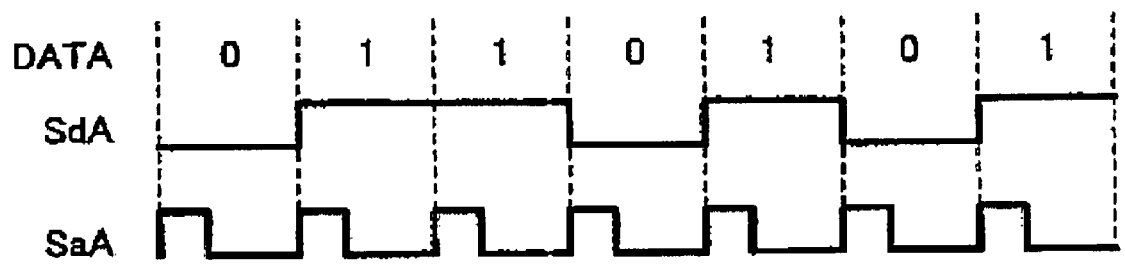
FIG. 4 is a diagram showing a method for transmitting a digital signal by a serial communication.
Figure 5:
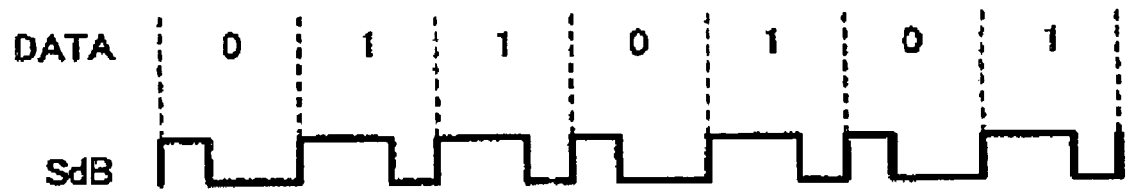
FIG. 5 is a diagram showing another method for transmitting a digital signal by a serial communication.
Figure 6:
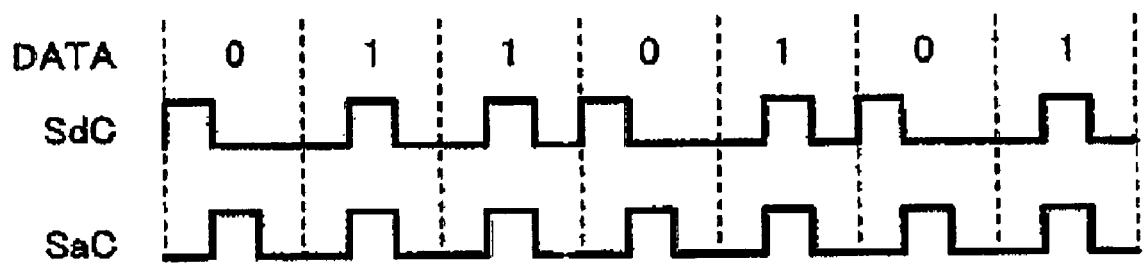
FIG. 6 is a diagram showing a still another method for transmitting a digital signal by a serial communication.
Figure 7:
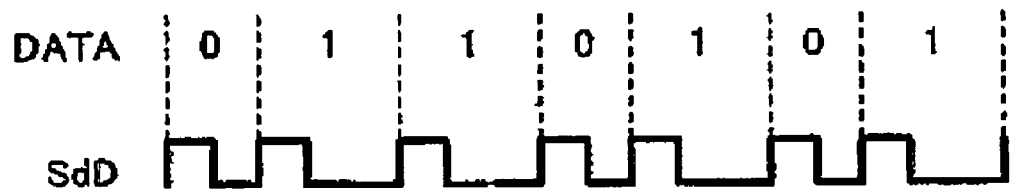
FIG. 7 is a diagram showing a further method for transmitting a digital signal by a serial communication.
Figure 8:
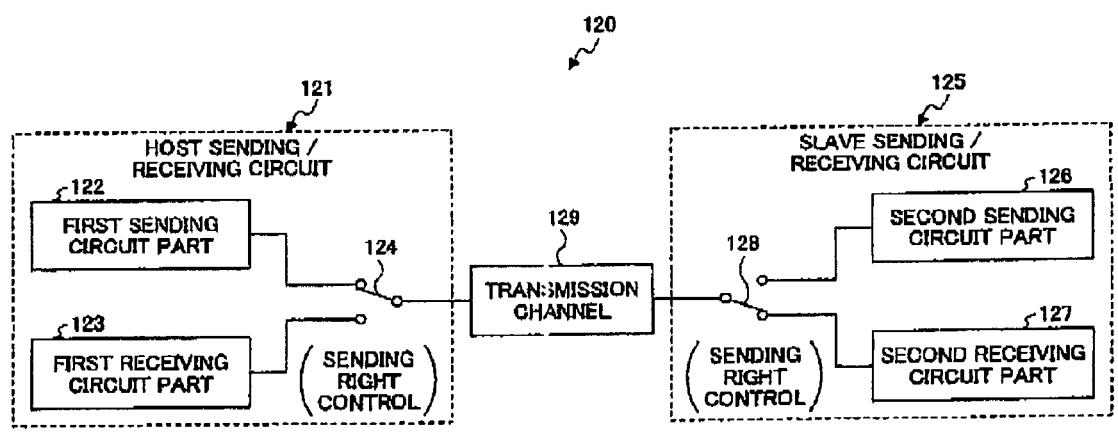
FIG. 8 is a schematic block diagram illustrating a conventional serial communication apparatus for conducing a half-duplex communication.

In FIG. 31, the slave sending/receiving circuit 2003a Includes the second sending circuit part 2013a and the second receiving circuit part 2014. The second receiving circuit part 2014 is the same as that in FIG. 7 and an explanation thereof will be omitted.

The second sending circuit part 2013a includes a T51 delaying circuit 51, a superimposing pulse generating circuit 2052a for generating a superimposing pulse signal S34a from the output signal S32 of the input signal delaying circuit 2042 and the output signal S33 of the T51 delaying circuit 2051, and an output signal generating circuit 2053a for generating the serial output signal So52 and outputting the serial output signal So52 to the transmission channel 2004. The superimposing pulse generating circuit 2052a corresponds to a second superimposing pulse generating circuit in claims, and the output signal generating circuit 2053a corresponds to a second output signal circuit.

The superimposing pulse generating circuit 2052a includes an AND circuit AN31. An input terminal and an output terminal of the T51 delaying circuit 2051 are corresponded and connected to two input terminals of the AND circuit AN31. An output signal S34a, which is formed by generating every high level term of the serial input signal Si52 one by one, is output from the output terminal of the AND circuit AN31.

The output signal generating circuit 2053a includes the AND circuit AN32 and the NPN transistor Tr31. The output signal S34a of the superimposing pulse generating circuit 2052a is connected to one input terminal of the AND circuit AN32 and the output data signal SDo52 is connected to another input terminal of the AND circuit AN32. The output terminal of the AND circuit AN32 is connected to a base of the NPN transistor Tr31, and the NPN transistor Tr31 is connected between the input terminal where the serial input signal Si52 and an earth ground. An output signal S36a is the output signal of the ANTD circuit AN32.

In this configuration, when the output signal S36a of the AND circuit AN32 becomes the high level, the NPN transistor Tr31 turns ON to lower the signal level of the serial input signal Si52. Therefore, as shown in FIG. 32, it is possible to generate the serial output signal So52 in which the superimposing pulse is superimposed over the serial input signal. As seen from FIG. 32, the second sending circuit part 2013a in FIG. 31 superimposes the superimposing pulse over the serial input signal Si52 only when the serial input signal Si52 is the high level. In a case of sending the data signal from the second sending circuit part 2013a to the host unit HC, a data signal density becomes half a case of sending the data signal from the host sending/receiving circuit 2003 to the slave sending/receiving circuit 2003. In this case, the serial output signal So52 is the same as that shown in FIG. 28B.

As described above, according to the sixth embodiment of the present invention, in the serial communication apparatus 2003a, the second sending circuit part 2013a superimposes the superimposing pulse over the serial input signal Si32 only when the serial Input signal Si52 is the high level. Therefore, it is possible to obtain the same effect as the fifth embodiment. In addition, when there is no data from the slave sending/receiving circuit 2003, the location of the start point is set every one period of the repeating signal. Thus, it is possible to further simplify the circuit configuration of the sending circuit part 2013a in the slave sending/receiving circuit 2003.

According to the fifth embodiment and the sixth embodiment, in the serial communication apparatuses 2003 and 2003a, the reference pulse signal having the pulse width having the time T53 and starting from a predetermined start point represents "1" and "0" of send data at a time point in which the time 52 shorter than the time T53 passes from the predetermined start point, by corresponding to a presence and absence of the superimposing pulse having a shorter width than the time T52. Accordingly, a synchronization signal, which is a line different from the data signal to send, is not required. Therefore, it is possible to configure the sending circuit parts 2013 and 2013a and the receiving circuit part 2014 by only a simple circuit such as two sets of a delaying circuit and a simple logic circuit. In addition, the delaying circuit can be significantly a simple circuit applying a time constant of a CR, so that it is possible to save circuit space and to improve cost performance.

Moreover, in the second sending/receiving circuit, the delaying circuit used in the receiving circuit part can be partially shared with the sending circuit part, and the sending circuit part itself can be configured by a simple logic circuit. In addition, the second sending/receiving circuit superimposes the superimposing pulse over the serial data signal having no data input to the second sending/receiving circuit to generate the serial data signal to output to the transmission channel. Therefore, the clock generating circuit and a circuit for controlling a sending right are not required and it is possible for the second sending/receiving circuit to save circuit space more than the first sending/receiving circuit and improve the cost performance.

Furthermore, when there is no send data from the second sending/receiving circuit, the location of the start point is set every one period of the reference pulse signal. Therefore, it is possible to further simplify the circuit configuration of the sending circuit part.

In the power supplying system, the serial communication apparatus can be applied to the first communicating part and the second communicating part. In addition, the serial transmitting apparatus can be applied to the serial communication apparatus.

According to the present invention, the power supplying system for supplying a power from a plurality of power supplying devices to each of a plurality of loads, may include: a first power supplying device including a first power supplying part for supplying a power to at least one of the plurality of loads, a controlling part for conducting an operation control of the first power supplying part, and a first communicating part for sending and receiving a signal to and from the controlling part; and at least one second power supplying device including a second power supplying part for supplying a power to at least one of the plurality of loads, and a second communicating part for sending and receiving a signal to and from the second power supplying part, wherein the first communicating part and the second communicating part send and receive signals each other, and the controlling part conducts the operation control of the second power supplying part through the first communicating part and the second communicating part, wherein a serial communication by a half-duplex communication is conducted between a first sending/receiving circuit in the first communicating part and a second sending/receiving circuit in the second communicating part in that at least one first sending/receiving circuit is connected to at least one second sending/receiving circuit through a transmission channel, wherein each of the first sending/receiving circuit and the second sending/receiving circuit includes: a sending circuit part for generating a serial data signal by superimposing a predetermined superimposing pulse over a send data signal having two values during a predetermined signal level and outputting the serial data signal; and a receiving circuit part for receiving the serial data signal sent from the sending circuit part, and extracting the send data signal by extracting the superimposing pulse from the serial data signal.

According to the present invention, the power supplying system for supplying a power from a plurality of power supplying devices to each of a plurality of loads may include: a first power supplying device including a first power supplying part for supplying a power to at least one of the plurality of loads, a controlling part for conducting an operation control of the first power supplying part, and a first communicating part for sending and receiving a signal to and from the controlling part; and at least one second power supplying device including a second power supplying part for supplying a power to at least one of the plurality of loads, and a second communicating part for sending and receiving a signal to and from the second power supplying part, wherein the first communicating part and the second communicating part send and receive signals each other, and the controlling part conducts the operation control of the second power supplying part through the first communicating part and the second communicating part, wherein a serial communication by a half-duplex communication is conducted between a first sending/receiving circuit in the first communicating part and a second sending/receiving circuit in the second communicating part in that at least one first sending/receiving circuit is connected to at least one second sending/receiving circuit through a transmission channel, wherein each of the first sending/receiving circuit and the second sending/receiving circuit includes: a sending circuit part for generating a serial data signal by superimposing a predetermined superimposing pulse over a send data signal having two values during a predetermined signal level, and outputting the serial data signal; and a receiving circuit part for receiving the serial data signal sent from the sending circuit part, and extracting the send data signal by extracting the superimposing pulse from the serial data signal, wherein, each of the first sending/receiving circuit and the first sending/receiving circuit includes, a sending part for converting each width of the plurality of digital input signals into a voltage in accordance with a predetermined weight, generating a send signal by adding voltages converted from the plurality of digital input signals, and outputting the send signal; and a receiving part for receiving the send signal from the sending part, comparing the send signal with a plurality of predetermined voltages, generating each of the digital input signals, and outputting the each of the digital input signals, so that a plurality of digital input signals are sent and received through a single signal line.

The present invention is not limited to the specifically disclosed embodiments, and variations and modifications may be made without departing from the scope of the present invention.

The present application is based on the Japanese Priority Patent Applications No. 2003-112930 filed on Apr. 17, 2003, No. 2003-112916 filed on Apr. 17, 2003, and No. 2003-112922 filed on Apr. 17, 2003 the entire contents of which are hereby incorporated by reference.

The invention claimed is:

1. A signal transmitting apparatus for communicating a plurality of digital input signals through a single signal line, said signal transmitting apparatus comprising:
   a sending part for converting an amplitude of each of the plurality of digital input signals into a weighted voltage in accordance with a predetermined weight, and generating a send signal by adding the weighted voltages converted from the plurality of digital input signals, and outputting the send signal; and
   a receiving part for receiving the send signal from the sending part, comparing the send signal with a plurality of predetermined reference voltages, generating a plurality of digital output signals corresponding to the plurality of digital input signals, based on the send signal, and outputting said plurality of the digital output signals,
   wherein said sending part includes input resistances, of which number is a same number as the digital signals, and an inversion amplifying circuit formed by an operational amplifier, and
   wherein a resistance value of each of the input resistances connecting to the inverting input terminal of the operational amplifier is set so that the amplitudes of each of the digital input signals are converted into the weighted voltages, in accordance with the predetermined weight.

2. The signal transmitting apparatus as claimed in claim 1, wherein a combined resistance value in a case of connecting the input resistances in series is approximately equal to a feedback resistance value of the operational amplifier.

3. The signal transmitting apparatus as claimed in claim 1, wherein the resistance value of each of the input resistances is weighted by a multiple of two.

4. The signal transmitting apparatus as claimed in claim 1, wherein a voltage of a non-inverting input terminal of the operational amplifier is set to be approximately half a power voltage.

5. The signal transmitting apparatus as claimed in claim 1, wherein said sending part adds the voltages being converted while a digital input signal having a greatest weight in the digital input signals is a predetermined signal level.

6. The signal transmitting apparatus as claimed in claim 5, wherein said sending part includes:
   a plurality of switching circuits each being controlled by one of the plurality of digital input signals; and
   a plurality of load resistances each being connected to one of the plurality of switching circuits in series,
   wherein a first load resistance connected to a first switching circuit, which is controlled by a first digital input signal having a greatest weight, is connected between a predetermined voltage and the first switching circuit, and a series circuit for a second switching circuit and a corresponding second load resistance is connected to the first switching circuit, which is controlled by the first digital input signal having the greatest weight, in parallel.

7. The signal transmitting apparatus as claimed in claim 6, wherein the first load resistance connected to the first switching circuit, which is controlled by the first digital input signal having the greatest weight, is set to be the same resistance value as a combined resistance value when the other load resistances are connected in parallel.

8. The signal transmitting apparatus as claimed in claim 1, wherein the send signal is transmitted from the sending part to the receiving part, through the single signal line.

9. The signal transmitting apparatus as claimed in claim 1, wherein a value of the send signal generated by adding the weighted voltages converted from the plurality of digital input signals uniquely corresponds to values of the digital inputs signals, such that said values of the digital input signals can be determined based solely on said value of the send signal.

10. The signal transmitting apparatus as claimed in claim 1, wherein a first weighting or first multiplication factor is used to convert a first amplitude of a first one of the digital input signals into a first weighted voltage, and
    wherein a second weighting or second multiplication factor, different from the first weighting or first multiplication factor, is used to convert a second amplitude of a second one of the digital input signals into a second weighted voltage.

11. The signal transmitting apparatus as claimed in claim 1, wherein the send signal is output from an output terminal of the operation amplifier.

12. A signal transmitting apparatus for communicating a plurality of digital input signals through a single signal line, said signal transmitting apparatus comprising:
    a sending part for converting an amplitude of each of the plurality of digital input signals into a weighted voltage in accordance with a predetermined weight, and generating a send signal by adding the weighted voltages converted from the plurality of digital input signals, and outputting the send signal; and
    a receiving part for receiving the send signal from the sending part, comparing the send signal with a plurality of predetermined reference voltages, generating a plurality of digital output signals corresponding to the plurality of digital input signals, based on the send signal, and outputting said plurality of the digital output signals, wherein said receiving part includes:

a reference voltage generating circuit for generating the plurality of predetermined reference voltages;

a voltage comparing circuit for comparing each of the plurality of predetermined reference voltages with the send signal received from said sending part, and outputting a plurality of comparison signals showing each comparison result; and a logic circuit for synthesizing each digital output signal based on the plurality of comparison signals of said voltage comparing circuit in accordance with a predetermined method, wherein said reference voltage generating circuit generates each of the plurality of predetermined reference voltages, of which number is resulted from multiplying a number of the digital input signals by two and subtracting one, and outputs said each of the plurality of predetermined reference voltages.

13. The signal transmitting apparatus as claimed in claim 12, wherein in a case of two digital input signals, in response to an output signal from said voltage comparing circuit for detecting one digital input signal which weight is greater than another digital input signal, said logic circuit cancels one of the output signals from the voltage comparing circuit for detecting another digital input signal.

14. The signal transmitting apparatus as claimed in claim 12, wherein said receiving part includes:

a reference voltage generating circuit for generating and outputting each of the plurality of predetermined reference voltages;

a voltage comparing circuit for comparing each of the plurality of predetermined reference voltages and the send signal received from said sending part, and outputting a plurality of comparison signals showing each comparison result; and a logic circuit for synthesizing each of the digital output signals based on the plurality of comparison signals of said voltage comparing circuit in accordance with a predetermined method.

15. The signal transmitting apparatus as claimed in claim 14, wherein in a case of two digital input signals, the plurality of comparison signals received from the voltage comparing circuit are equal to the plurality of digital input signals, and said logic circuit directly outputs the plurality of comparison signals received from the voltage comparing circuit.

16. The signal transmitting apparatus as claimed in claim 12, wherein the receiving part determines the value of the send signal by comparing the value of the send signal with the plurality of predetermined reference voltages.

* * * * *